US006439711B1

(12) United States Patent
Carlini et al.

(10) Patent No.: US 6,439,711 B1
(45) Date of Patent: Aug. 27, 2002

(54) BALLISTIC AEROSOL MARKING PROCESS EMPLOYING MARKING MATERIAL COMPRISING POLYESTER RESIN AND POLY (3,4-ETHYLENEDIOXYTHIOPHENE)

(75) Inventors: Rina Carlini, Mississauga; Karen A. Moffat, Brantford; Maria N. V. McDougall, Burlington; Danielle C. Boils, Mississauga, all of (CA)

(73) Assignee: Xerox Corporation, Stamford, CT (US)

( * ) Notice: Subject to any disclaimer, the term of this patent is extended or adjusted under 35 U.S.C. 154(b) by 84 days.

(21) Appl. No.: 09/723,787

(22) Filed: Nov. 28, 2000

(51) Int. Cl.$^7$ ................................................ G01D 11/00

(52) U.S. Cl. .......................... 347/100; 347/20; 430/137

(58) Field of Search ........................... 347/100, 21, 20; 430/126, 137, 109

(56) References Cited

U.S. PATENT DOCUMENTS

| | | | | |
|---|---|---|---|---|
| 4,299,898 A | | 11/1981 | Williams et al. | 430/106 |
| 5,035,926 A | | 7/1991 | Jonas et al. | 427/393.1 |
| 5,202,211 A | | 4/1993 | Vercoulen et al. | 430/109 |
| 5,348,832 A | * | 9/1994 | Sacripante et al. | 430/137 |
| 5,403,693 A | | 4/1995 | Patel et al. | 430/137.14 |
| 5,457,001 A | | 10/1995 | Van Ritter | 430/110 |
| 5,482,655 A | * | 1/1996 | Vogel et al. | 528/373 |
| 5,585,215 A | * | 12/1996 | Ong et al. | 430/137 |
| 5,766,817 A | | 6/1998 | Cheng et al. | 430/137 |
| 5,834,080 A | | 11/1998 | Mort et al. | 428/36.91 |
| 5,853,906 A | | 12/1998 | Hsieh | 428/690 |
| 5,962,178 A | | 10/1999 | Cheng | 430/137 |
| 6,013,404 A | | 1/2000 | Feng et al. | 430/126 |
| 6,025,104 A | | 2/2000 | Fuller et al. | 430/109 |
| 6,302,513 B1 | * | 10/2001 | Moffat et al. | 347/20 |
| 6,365,318 B1 | * | 4/2002 | Moffat et al. | 430/137.15 |

FOREIGN PATENT DOCUMENTS

| | | |
|---|---|---|
| EP | 0 339 340 A2 | 4/1989 |
| EP | 0 440 957 A2 | 12/1990 |
| EP | 0 636 943 A1 | 6/1994 |
| EP | 0636943 A1 | 2/1995 |
| JP | 61-141452 | 6/1986 |
| JP | 62264066 | 11/1987 |
| JP | 03 086763 | 4/1991 |
| JP | 3-100561 | 4/1991 |

OTHER PUBLICATIONS

CAPLUS Abstract Acc No. 1992:13303 describing JP 3–100561.

Japanese Patent Office Abstract describing JP 3–100561.

CAPLUS Abstract Acc. No. 1986:616683 describing JP 61–141452.

Derwent Abstract, Section Ch, Week 199433 describing JP 06 196309.

English Translation for 356/Research Disclosure, May 1995.

* cited by examiner

*Primary Examiner*—John Barlow
*Assistant Examiner*—Manish S. Shah
(74) *Attorney, Agent, or Firm*—Judith L. Byorick

(57) ABSTRACT

Disclosed is a process for depositing marking material onto a substrate which includes (a) providing a propellant to a head structure, said head structure having at least one channel therein, said channel having an exit orifice with a width no larger than about 250 microns through which the propellant can flow, said propellant flowing through the channel to form thereby a propellant stream having kinetic energy, said channel directing the propellant stream toward the substrate, and (b) controllably introducing a particulate marking material into the propellant stream in the channel, wherein the kinetic energy of the propellant particle stream causes the particulate marking material to impact the substrate, and wherein the particulate marking material comprises toner particles which comprise a polyester resin, an optional colorant, and poly(3,4-ethylenedioxythiophene), said toner particles having an average particle diameter of no more than about 10 microns and a particle size distribution of GSD equal to no more than about 1.25, wherein said toner particles are prepared by an emulsion aggregation process, said toner particles having an average bulk conductivity of at least about $10^{-11}$ Siemens per centimeter.

32 Claims, 8 Drawing Sheets

BALLISTIC AEROSOL MARKING PROCESS EMPLOYING MARKING MATERIAL COMPRISING POLYESTER RESIN AND POLY (3,4-ETHYLENEDIOXYTHIOPHENE)

CROSS REFERENCES TO RELATED APPLICATIONS

Copending Application U.S. Ser. No. 09/408,606, filed Sep. 30, 1999, entitled "Marking Materials and Marking Processes Therewith," with the named inventors Richard P. Veregin, Carl P. Tripp, Maria N. McDougall, and T. Brian McAneney, the disclosure of which is totally incorporated herein by reference, discloses an apparatus for depositing a particulate marking material onto a substrate, comprising (a) a printhead having defined therein at least one channel, each channel having an inner surface and an exit orifice with a width no larger than about 250 microns, the inner surface of each channel having thereon a hydrophobic coating material; (b) a propellant source connected to each channel such that propellant provided by the propellant source can flow through each channel to form propellant streams therein, said propellant streams having kinetic energy, each channel directing the propellant stream through the exit orifice toward the substrate; and (c) a marking material reservoir having an inner surface, said inner surface having thereon the hydrophobic coating material, said reservoir containing particles of a particulate marking material, said reservoir being communicatively connected to each channel such that the particulate marking material from the reservoir can be controllably introduced into the propellant stream in each channel so that the kinetic energy of the propellant stream can cause the particulate marking material to impact the substrate, wherein either (i) the marking material particles of particulate marking material have an outer coating of the hydrophobic coating material; or (ii) the marking material particles have additive particles on the surface thereof, said additive particles having an outer coating of the hydrophobic coating material; or (iii) both the marking material particles and the additive particles have an outer coating of the hydrophobic coating material.

Copending Application U.S. Ser. No. 09/410,271, filed Sep. 30, 1999, entitled "Marking Materials and Marking Processes Therewith," with the named inventors Karen A. Moffat, Richard P. Veregin, Maria N. McDougall, Philip D. Floyd, Jaan Noolandi, T. Brian McAneney, and Daniele C. Boils-Boissier, the disclosure of which is totally incorporated herein by reference, discloses a process for depositing marking material onto a substrate which comprises (a) providing a propellant to a head structure, said head structure having a channel therein, said channel having an exit orifice with a width no larger than about 250 microns through which the propellant can flow, said propellant flowing through the channel to form thereby a propellant stream having kinetic energy, said channel directing the propellant stream toward the substrate, and (b) controllably introducing a particulate marking material into the propellant stream in the channel, wherein the kinetic energy of the propellant particle stream causes the particulate marking material to impact the substrate, and wherein the particulate marking material comprises particles which comprise a resin and a colorant, said particles having an average particle diameter of no more than about 7 microns and a particle size distribution of GSD equal to no more than about 1.25, wherein said particles are prepared by an emulsion aggregation process.

Copending Application U.S. Ser. No. 09/585,044, filed Jun. 1, 2000, entitled "Marking Material and Ballistic Aerosol Marking Process for the Use Thereof," with the named inventors Maria N. V. McDougall, Richard P. N. Veregin, and Karen A. Moffat, the disclosure of which is totally incorporated herein by reference, discloses a marking material comprising (a) toner particles which comprise a resin and a colorant, said particles having an average particle diameter of no more than about 7 microns and a particle size distribution of GSD equal to no more than about 1.25, wherein said toner particles are prepared by an emulsion aggregation process, and (b) hydrophobic conductive metal oxide particles situated on the toner particles. Also disclosed is a process for depositing marking material onto a substrate which comprises (a) providing a propellant to a head structure, said head structure having a channel therein, said channel having an exit orifice with a width no larger than about 250 microns through which the propellant can flow, said propellant flowing through the channel to form thereby a propellant stream having kinetic energy, said channel directing the propellant stream toward the substrate, and (b) controllably introducing a particulate marking material into the propellant stream in the channel, wherein the kinetic energy of the propellant particle stream causes the particulate marking material to impact the substrate, and wherein the particulate marking material comprises (a) toner particles which comprise a resin and a colorant, said particles having an average particle diameter of no more than about 7 microns and a particle size distribution of GSD equal to no more than about 1.25, wherein said toner particles are prepared by an emulsion aggregation process, and (b) hydrophobic conductive metal oxide particles situated on the toner particles.

Copending Application U.S. Ser. No. 09/723,778, filed concurrently herewith, entitled "Ballistic Aerosol Marking Process Employing Marking Material Comprising Vinyl Resin and Poly(3,4-ethylenedioxythiophene)," with the named inventors Karen A. Moffat and Maria N. V. McDougall, the disclosure of which is totally incorporated herein by reference, discloses a process for depositing marking material onto a substrate which comprises (a) providing a propellant to a head structure, said head structure having at least one channel therein, said channel having an exit orifice with a width no larger than about 250 microns through which the propellant can flow, said propellant flowing through the channel to form thereby a propellant stream having kinetic energy, said channel directing the propellant stream toward the substrate, and (b) controllably introducing a particulate marking material into the propellant stream in the channel, wherein the kinetic energy of the propellant particle stream causes the particulate marking material to impact the substrate, and wherein the particulate marking material comprises toner particles which comprise a vinyl resin, an optional colorant, and poly(3,4-ethylenedioxythiophene), said toner particles having an average particle diameter of no more than about 10 microns and a particle size distribution of GSD equal to no more than about 1.25, wherein said toner particles are prepared by an emulsion aggregation process, said toner particles having an average bulk conductivity of at least about $10^{-11}$ Siemens per centimeter.

Copending Application U.S. Ser. No. 09/723,577, filed concurrently herewith, entitled "Ballistic Aerosol Marking Process Employing Marking Material Comprising Vinyl Resin and Poly(3,4-ethylenedioxypyrrole)," with the named inventors Karen A. Moffat, Rina Carlini, Maria N. V. McDougall, and Paul J. Gerroir, the disclosure of which is totally incorporated herein by reference, discloses a process for depositing marking material onto a substrate which comprises (a) providing a propellant to a head structure, said head structure having at least one channel therein, said channel having an exit orifice with a width no larger than about 250 microns through which the propellant can flow, said propellant flowing through the channel to form thereby a propellant stream having kinetic energy, said channel directing the propellant stream toward the substrate, and (b) controllably introducing a particulate marking material into the propellant stream in the channel, wherein the kinetic energy of the propellant particle stream causes the particulate marking material to impact the substrate, and wherein the particulate marking material comprises toner particles which comprise a vinyl resin, an optional colorant, and poly(3,4-ethylenedioxypyrrole), said toner particles having an average particle diameter of no more than about 10 microns and a particle size distribution of GSD equal to no more than about 1.25, wherein said toner particles are prepared by an emulsion aggregation process, said toner particles having an average bulk conductivity of at least about $10^{-11}$ Siemens per centimeter.

Copending Application U.S. Ser. No. 09/724,458, filed concurrently herewith, entitled "Toner Compositions Comprising Polythiophenes," with the named inventors Karen A. Moffat, Maria N. V. McDougall, Rina Carlini, Dan A. Hays, Jack T. Lestrange, and Paul J. Gerroir, the disclosure of which is totally incorporated herein by reference, discloses a toner comprising particles of a resin and an optional colorant, said toner particles having coated thereon a polythiophene. Another embodiment is directed to a process which comprises (a) generating an electrostatic latent image on an imaging member, and (b) developing the latent image by contacting the imaging member with charged toner particles comprising a resin and an optional colorant, said toner particles having coated thereon a polythiophene.

Copending Application U.S. Ser. No. 09/723,839, filed concurrently herewith, entitled "Toner Compositions Comprising Polypyrroles," with the named inventors Karen A. Moffat, Maria N. V. McDougall, Rina Carlini, Dan A. Hays, Jack T. Lestrange, and James R. Combes, the disclosure of which is totally incorporated herein by reference, discloses a toner comprising particles of a resin and an optional colorant, said toner particles having coated thereon a polypyrrole. Another embodiment is directed to a process which comprises (a) generating an electrostatic latent image on an imaging member, and (b) developing the latent image by contacting the imaging member with charged toner particles comprising a resin and an optional colorant, said toner particles having coated thereon a polypyrrole.

Copending Application U.S. Ser. No. 09/723,834, filed concurrently herewith, entitled "Ballistic Aerosol Marking Process Employing Marking Material Comprising Polyester Resin and Poly(3,4-ethylenedioxypyrrole)," with the named inventors Karen A. Moffat, Rina Carlini, and Maria N. V. McDougall, the disclosure of which is totally incorporated herein by reference, discloses a process for depositing marking material onto a substrate which comprises (a) providing a propellant to a head structure, said head structure having at least one channel therein, said channel having an exit orifice with a width no larger than about 250 microns through which the propellant can flow, said propellant flowing through the channel to form thereby a propellant stream having kinetic energy, said channel directing the propellant stream toward the substrate, and (b) controllably introducing a particulate marking material into the propellant stream in the channel, wherein the kinetic energy of the propellant particle stream causes the particulate marking material to impact the substrate, and wherein the particulate marking material comprises toner particles which comprise a polyester resin, an optional colorant, and poly(3,4-ethylenedioxypyrrole), said toner particles having an average particle diameter of no more than about 10 microns and a particle size distribution of GSD equal to no more than about 1.25, wherein said toner particles are prepared by an emulsion aggregation process, said toner particles having an average bulk conductivity of at least about $10^{-11}$ Siemens per centimeter.

Copending Application U.S. Ser. No. 09/724,064, filed concurrently herewith, entitled "Toner Compositions Comprising Polyester Resin and Poly(3,4-ethylenedioxythiophene)," with the named inventors Karen A. Moffat, Rina Carlini, Maria N. V. McDougall, Dan A. Hays, and Jack T. Lestrange, the disclosure of which is totally incorporated herein by reference, discloses a toner comprising particles of a polyester resin, an optional colorant, and poly(3,4-ethylenedioxythiophene), wherein said toner particles are prepared by an emulsion aggregation process. Another embodiment is directed to a process which comprises (a) generating an electrostatic latent image on an imaging member, and (b) developing the latent image by contacting the imaging member with charged toner particles comprising a polyester resin, an optional colorant, and poly(3,4-ethylenedioxythiophene), wherein said toner particles are prepared by an emulsion aggregation process.

Copending Application U.S. Ser. No. 09/723,851, filed concurrently herewith, entitled "Toner Compositions Comprising Vinyl Resin and Poly(3,4-ethylenedioxypyrrole)," with the named inventors Karen A. Moffat, Maria N. V. McDougall, Rina Carlini, Dan A. Hays, Jack T. Lestrange, and Paul J. Gerroir, the disclosure of which is totally incorporated herein by reference, discloses a toner comprising particles of a vinyl resin, an optional colorant, and poly(3,4-ethylenedioxypyrrole), wherein said toner particles are prepared by an emulsion aggregation process. Another embodiment is directed to a process which comprises (a) generating an electrostatic latent image on an imaging member, and (b) developing the latent image by contacting the imaging member with charged toner particles comprising a vinyl resin, an optional colorant, and poly(3,4-ethylenedioxypyrrole), wherein said toner particles are prepared by an emulsion aggregation process.

Copending Application U.S. Ser. No. 09/723,907, filed concurrently herewith, entitled "Toner Compositions Comprising Polyester Resin and Poly(3,4-ethylenedioxypyrrole)," with the named inventors Karen A. Moffat, Rina Carlini, Maria N. V. McDougall, Dan A. Hays, and Jack T. Lestrange, the disclosure of which is totally incorporated herein by reference, discloses a toner comprising particles of a polyester resin, an optional colorant, and poly(3,4-ethylenedioxypyrrole), wherein said toner particles are prepared by an emulsion aggregation process. Another embodiment is directed to a process which comprises (a) generating an electrostatic latent image on an imaging member, and (b) developing the latent image by contacting the imaging member with charged toner particles comprising a polyester resin, an optional colorant, and poly(3,4-ethylenedioxypyrrole), wherein said toner particles are prepared by an emulsion aggregation process.

Copending Application U.S. Ser. No. 09/724,013, filed concurrently herewith, entitled "Toner Compositions Comprising Vinyl Resin and Poly(3,4-ethylenedioxythiophene)," with the named inventors Karen A. Moffat, Maria N. V. McDougall, Rina Carlini, Dan A. Hays, Jack T. Lestrange, and Paul J. Gerroir, the disclosure of which is totally incorporated herein by reference, discloses a toner comprising particles of a vinyl resin, an optional colorant, and poly(3,4-ethylenedioxythiophene), wherein said toner particles are prepared by an emulsion aggregation process. Another embodiment is directed to a process which comprises (a) generating an electrostatic latent image on an imaging member, and (b) developing the latent image by contacting the imaging member with charged toner particles comprising a vinyl resin, an optional colorant, and poly(3,4-ethylenedioxythiophene), wherein said toner particles are prepared by an emulsion aggregation process.

Copending Application U.S. Ser. No. 09/723,654, filed concurrently herewith, entitled "Process for Controlling Triboelectric Charging," with the named inventors Karen A. Moffat, Maria N. V. McDougall, and James R. Combes, the disclosure of which is totally incorporated herein by reference, discloses a process which comprises (a) dispersing into a solvent (i) toner particles comprising a resin and an optional colorant, and (ii) monomers selected from pyrroles, thiophenes, or mixtures thereof; and (b) causing, by exposure of the monomers to an oxidant, oxidative polymerization of the monomers onto the toner particles, wherein subsequent to polymerization, the toner particles are capable of being charged to a negative or positive polarity, and wherein the polarity is determined by the oxidant selected.

Copending Application U.S. Ser. No. 09/723,911, filed concurrently herewith, entitled "Toner Compositions Comprising Polyester Resin and Polypyrrole," with the named inventors James R. Combes, Karen A. Moffat, and Maria N. V. McDougall, the disclosure of which is totally incorporated herein by reference, discloses a toner comprising particles of a polyester resin, an optional colorant, and polypyrrole, wherein said toner particles are prepared by an emulsion aggregation process. Another embodiment is directed to a process which comprises (a) generating an electrostatic latent image on an imaging member, and (b) developing the latent image by contacting the imaging member with charged toner particles comprising a polyester resin, an optional colorant, and polypyrrole, wherein said toner particles are prepared by an emulsion aggregation process.

BACKGROUND OF THE INVENTION

The present invention is directed to an imaging process. More specifically, the present invention is directed to a ballistic aerosol marking process using specific marking materials. One embodiment of the present invention is directed to a process for depositing marking material onto a substrate which comprises (a) providing a propellant to a head structure, said head structure having at least one channel therein, said channel having an exit orifice with a width no larger than about 250 microns through which the propellant can flow, said propellant flowing through the channel to form thereby a propellant stream having kinetic energy, said channel directing the propellant stream toward the substrate, and (b) controllably introducing a particulate marking material into the propellant stream in the channel, wherein the kinetic energy of the propellant particle stream causes the particulate marking material to impact the substrate, and wherein the particulate marking material comprises toner particles which comprise a polyester resin, an optional colorant, and poly(3,4-ethylenedioxythiophene), said toner particles having an average particle diameter of no more than about 10 microns and a particle size distribution of GSD equal to no more than about 1.25, wherein said toner particles are prepared by an emulsion aggregation process, said toner particles having an average bulk conductivity of at least about $10^{-11}$ Siemens per centimeter.

Ink jet is currently a common printing technology. There are a variety of types of ink jet printing, including thermal ink jet printing, piezoelectric ink jet printing, and the like. In ink jet printing processes, liquid ink droplets are ejected from an orifice located at one terminus of a channel. In a thermal ink jet printer, for example, a droplet is ejected by the explosive formation of a vapor bubble within an ink bearing channel. The vapor bubble is formed by means of a heater, in the form of a resistor, located on one surface of the channel.

Several disadvantages can be associated with known ink jet systems. For a 300 spot-per-inch (spi) thermal ink jet system, the exit orifice from which an ink droplet is ejected is typically on the order of about 64 microns in width, with a channel-to-channel spacing (pitch) of typically about 84 microns; for a 600 dpi system, width is typically about 35 microns and pitch is typically about 42 microns. A limit on the size of the exit orifice is imposed by the viscosity of the fluid ink used by these systems. It is possible to lower the viscosity of the ink by diluting it with increasing amounts of liquid (such as water) with an aim to reducing the exit orifice width. The increased liquid content of the ink, however, results in increased wicking, paper wrinkle, and slower drying time of the ejected ink droplet, which negatively affects resolution, image quality (such as minimum spot size, intercolor mixing, spot shape), and the like. The effect of this orifice width limitation is to limit resolution of thermal ink jet printing, for example to well below 900 spi, because spot size is a function of the width of the exit orifice, and resolution is a function of spot size.

Another disadvantage of known ink jet technologies is the difficulty of producing grayscale printing. It is very difficult for an ink jet system to produce varying size spots on a printed substrate. If one lowers the propulsive force (heat in a thermal ink jet system) so as to eject less ink in an attempt to produce a smaller dot, or likewise increases the propulsive force to eject more ink and thereby to produce a larger dot, the trajectory of the ejected droplet is affected. The altered trajectory in turn renders precise dot placement difficult or impossible, and not only makes monochrome grayscale printing problematic, it makes multiple color grayscale ink jet printing impracticable. In addition, preferred grayscale printing is obtained not by varying the dot size, as is the case for thermal ink jet, but by varying the dot density while keeping a constant dot size.

Still another disadvantage of common ink jet systems is rate of marking obtained. Approximately 80 percent of the time required to print a spot is taken by waiting for the ink jet channel to refill with ink by capillary action. To a certain degree, a more dilute ink flows faster, but raises the problem of wicking, substrate wrinkle, drying time, and the like, discussed above.

One problem common to ejection printing systems is that the channels may become clogged. Systems such as thermal ink jet which employ aqueous ink colorants are often sensitive to this problem, and routinely employ non-printing cycles for channel cleaning during operation. This cleaning is required, since ink typically sits in an ejector waiting to be ejected during operation, and while sitting may begin to dry and lead to clogging.

Ballistic aerosol marking processes overcome many of these disadvantages. Ballistic aerosol marking is a process for applying a marking material to a substrate, directly or indirectly. In particular, the ballistic aerosol marking system includes a propellant which travels through a channel, and a marking material that is controllably (i.e., modifiable in use)

introduced, or metered, into the channel such that energy from the propellant propels the marking material to the substrate. The propellant is usually a dry gas that can continuously flow through the channel while the marking apparatus is in an operative configuration (i.e., in a power-on or similar state ready to mark). Examples of suitable propellants include carbon dioxide gas, nitrogen gas, clean dry ambient air, gaseous products of a chemical reaction, or the like; preferably, non-toxic propellants are employed, although in certain embodiments, such as devices enclosed in a special chamber or the like, a broader range of propellants can be tolerated. The system is referred to as "ballistic aerosol marking" in the sense that marking is achieved by in essence launching a non-colloidal, solid or semi-solid particulate, or alternatively a liquid, marking material at a substrate. The shape of the channel can result in a collimated (or focused) flight of the propellant and marking material onto the substrate.

The propellant can be introduced at a propellant port into the channel to form a propellant stream. A marking material can then be introduced into the propellant stream from one or more marking material inlet ports. The propellant can enter the channel at a high velocity. Alternatively, the propellant can be introduced into the channel at a high pressure, and the channel can include a constriction (for example, de Laval or similar converging/diverging type nozzle) for converting the high pressure of the propellant to high velocity. In such a situation, the propellant is introduced at a port located at a proximal end of the channel (the converging region), and the marking material ports are provided near the distal end of the channel (at or further down-stream of the diverging region), allowing for introduction of marking material into the propellant stream.

In the situation where multiple ports are provided, each port can provide for a different color (for example, cyan, magenta, yellow, and black), pre-marking treatment material (such as a marking material adherent), post-marking treatment material (such as a substrate surface finish material, for example, matte or gloss coating, or the like), marking material not otherwise visible to the unaided eye (for example, magnetic particle-bearing material, ultraviolet-fluorescent material, or the like) or other marking material to be applied to the substrate. Examples of materials suitable for pre-marking treatment and post-marking treatment include polyester resins (either linear or branched); poly(styrenic) homopolymers; poly(acrylate) and poly(methacrylate) homopolymers and mixtures thereof; random copolymers of styrenic monomers with acrylate, methacrylate, or butadiene monomers and mixtures thereof; polyvinyl acetals; poly(vinyl alcohol)s; vinyl alcohol-vinyl acetal copolymers; polycarbonates; mixtures thereof; and the like. The marking material is imparted with kinetic energy from the propellant stream, and ejected from the channel at an exit orifice located at the distal end of the channel in a direction toward a substrate.

One or more such channels can be provided in a structure which, in one embodiment, is referred to herein as a printhead. The width of the exit (or ejection) orifice of a channel is typically on the order of about 250 microns or smaller, and preferably in the range of about 100 microns or smaller. When more than one channel is provided, the pitch, or spacing from edge to edge (or center to center) between adjacent channels can also be on the order of about 250 microns or smaller, and preferably in the range of about 100 microns or smaller. Alternatively, the channels can be staggered, allowing reduced edge-to-edge spacing. The exit orifice and/or some or all of each channel can have a circular, semicircular, oval, square, rectangular, triangular or other cross-sectional shape when viewed along the direction of flow of the propellant stream (the channel's longitudinal axis).

The marking material to be applied to the substrate can be transported to a port by one or more of a wide variety of ways, including simple gravity feed, hydrodynamic, electrostatic, ultrasonic transport, or the like. The material can be metered out of the port into the propellant stream also by one of a wide variety of ways, including control of the transport mechanism, or a separate system such as pressure balancing, electrostatics, acoustic energy, ink jet, or the like.

The marking material to be applied to the substrate can be a solid or semi-solid particulate material, such as a toner or variety of toners in different colors, a suspension of such a marking material in a carrier, a suspension of such a marking material in a carrier with a charge director, a phase change material, or the like. Preferably the marking material is particulate, solid or semi-solid, and dry or suspended in a liquid carrier. Such a marking material is referred to herein as a particulate marking material. A particulate marking material is to be distinguished from a liquid marking material, dissolved marking material, atomized marking material, or similar non-particulate material, which is generally referred to herein as a liquid marking material. However, ballistic aerosol marking processes are also able to utilize such a liquid marking material in certain applications.

Ballistic aerosol marking processes also enable marking on a wide variety of substrates, including direct marking on non-porous substrates such as polymers, plastics, metals, glass, treated and finished surfaces, and the like. The reduction in wicking and elimination of drying time also provides improved printing to porous substrates such as paper, textiles, ceramics, and the like. In addition, ballistic aerosol marking processes can be configured for indirect marking, such as marking to an intermediate transfer member such as a roller or belt (which optionally can be heated), marking to a viscous binder film and nip transfer system, or the like.

The marking material to be deposited on a substrate can be subjected to post-ejection modification, such as fusing or drying, overcoating, curing, or the like. In the case of fusing, the kinetic energy of the material to be deposited can itself be sufficient effectively to melt the marking material upon impact with the substrate and fuse it to the substrate. The substrate can be heated to enhance this process. Pressure rollers can be used to cold-fuse the marking material to the substrate. In-flight phase change (solid-liquid-solid) can alternatively be employed. A heated wire in the particle path is one way to accomplish the initial phase change. Alternatively, propellant temperature can accomplish this result. In one embodiment, a laser can be employed to heat and melt the particulate material in-flight to accomplish the initial phase change. The melting and fusing can also be electrostatically assisted (i.e., retaining the particulate material in a desired position to allow ample time for melting and fusing into a final desired position). The type of particulate can also dictate the post-ejection modification. For example, ultraviolet curable materials can be cured by application of ultraviolet radiation, either in flight or when located on the material-bearing substrate.

Since propellant can continuously flow through a channel, channel clogging from the build-up of material is reduced (the propellant effectively continuously cleans the channel). In addition, a closure can be provided that isolates the channels from the environment when the system is not in use. Alternatively, the printhead and substrate support (for example, a platen) can be brought into physical contact to effect a closure of the channel. Initial and terminal cleaning cycles can be designed into operation of the printing system to optimize the cleaning of the channel(s). Waste material cleaned from the system can be deposited in a cleaning station. It is also possible, however, to engage the closure against an orifice to redirect the propellant stream through the port and into the reservoir thereby to flush out the port.

Further details on the ballistic aerosol marking process are disclosed in, for example, Copending Application U.S. Ser. No. 09/163,893, filed Sep. 30, 1998, with the named inventors Gregory B. Anderson, Steven B. Bolte, Dan A. Hays, Warren B. Jackson, Gregory J. Kovacs, Meng H. Lean, Jaan Noolandi, Joel A. Kubby, Eric Peeters, Raj B. Apte, Philip D. Floyd, An-Chang Shi, Frederick J. Endicott, Armin R. Volkel, and Jonathan A. Small, entitled "Ballistic Aerosol Marking Apparatus for Marking a Substrate," Copending Application U.S. Ser. No. 09/164,124, filed Sep. 30, 1998, with the named inventors Gregory B. Anderson, Steven B. Bolte, Dan A. Hays, Warren B. Jackson, Gregory J. Kovacs, Meng H. Lean, Jaan Noolandi, Joel A. Kubby, Eric Peeters, Raj B. Apte, Philip D. Floyd, An-Chang Shi, Frederick J. Endicott, Armin R. Volkel, and Jonathan A. Small, entitled "Method of Marking a Substrate Employing a Ballistic Aerosol Marking Apparatus," Copending Application U.S. Ser. No. 09/164,250, filed Sep. 30, 1998, with the named inventors Gregory B. Anderson, Danielle C. Boils, Steven B. Bolte, Dan A. Hays, Warren B. Jackson, Gregory J. Kovacs, Meng H. Lean, T. Brian McAneney, Maria N. V. McDougall, Karen A. Moffat, Joan Noolandi, Richard P. N. Veregin, Paul D. Szabo, Joel A. Kubby, Eric Peeters, Raj B. Apte, Philip D. Floyd, An-Chang Shi, Frederick J. Endicott, Armin R. Volkel, and Jonathan A. Small, entitled "Ballistic Aerosol Marking Apparatus for Treating a Substrate," Copending Application U.S. Ser. No. 09/163,808, filed Sep. 30, 1998, with the named inventors Gregory B. Anderson, Danielle C. Boils, Steven B. Bolte, Dan A. Hays, Warren B. Jackson, Gregory J. Kovacs, Meng H. Lean, T. Brian McAneney, Maria N. V. McDougall, Karen A. Moffat, Jaan Noolandi, Richard P. N. Veregin, Paul D. Szabo, Joel A. Kubby, Eric Peeters, Raj B. Apte, Philip D. Floyd, An-Chang Shi, Frederick J. Endicott, Armin R. Volkel, and Jonathan A. Small, entitled "Method of Treating a Substrate Employing a Ballistic Aerosol Marking Apparatus," Copending Application U.S. Ser. No. 09/163,765, filed Sep. 30, 1998, with the named inventors Gregory B. Anderson, Steven B. Bolte, Dan A. Hays, Warren B. Jackson, Gregory J. Kovacs, Meng H. Lean, Jaan Noolandi, Joel A. Kubby, Eric Peeters, Raj B. Apte, Philip D. Floyd, An-Chang Shi, Frederick J. Endicott, Armin R. Volkel, and Jonathan A. Small, entitled "Cartridge for Use in a Ballistic Aerosol Marking Apparatus," Copending Application U.S. Ser. No. 09/163,839, filed Sep. 30, 1998, with the named inventors Abdul M. Elhatem, Dan A. Hays, Jaan Noolandi, Kaiser H. Wong, Joel A. Kubby, Tuan Anh Vo, and Eric Peeters, entitled "Marking Material Transport," Copending Application U.S. Ser. No. 09/163, 954, filed Sep. 30, 1998, with the named inventors Gregory B. Anderson, Andrew A. Berlin, Steven B. Bolte, Go Neville Connell, Dan A. Hays, Warren B. Jackson, Gregory J. Kovacs, Meng H. Lean, Jaan Noolandi, Joel A. Kubby, Eric Peeters, Raj B. Apte, Philip D. Floyd, An-Chang Shi, Frederick J. Endicott, Armin R. Volkel, and Jonathan A. Small, entitled "Ballistic Aerosol Marking Apparatus for Marking with a Liquid Material," Copending Application U.S. Ser. No. 09/163,924, filed Sep. 30, 1998, with the named inventors Gregory B. Anderson, Andrew A. Berlin, Steven B. Bolte, Ga Neville Connell, Dan A. Hays, Warren B. Jackson, Gregory J. Kovacs, Meng H. Lean, Jaan Noolandi, Joel A. Kubby, Eric Peeters, Raj B. Apte, Philip D. Floyd, An-Chang Shi, Frederick J. Endicott, Armin R. Volkel, and Jonathan A. Small, entitled "Method for Marking with a Liquid Material Using a Ballistic Aerosol Marking Apparatus," Copending Application U.S. Ser. No. 09/163,825, filed Sep. 30, 1998, with the named inventor Kaiser H. Wong, entitled "Multi-Layer Organic Overcoat for Electrode Grid," Copending Application U.S. Ser. No. 09/164,104, filed Sep. 30, 1998, with the named inventors T. Brian McAneney, Jaan Noolandi, and An-Chang Shi, entitled "Kinetic Fusing of a Marking Material," Application U.S. Ser. No. 09/163,904 (now U.S. Pat. No. 6,116,718), filed Sep. 30, 1998, with the named inventors Meng H. Lean, Jaan Noolandi, Eric Peeters, Raj B. Apte, Philip D. Floyd, and Armin R. Volkel, entitled "Print Head for Use in a Ballistic Aerosol Marking Apparatus," Copending Application U.S. Ser. No. 09/163,799, filed Sep. 30, 1998, with the named inventors Meng H. Lean, Jaan Noolandi, Eric Peeters, Raj B. Apte, Philip D. Floyd, and Armin R. Volkel, entitled "Method of Making a Print Head for Use in a Ballistic Aerosol Marking Apparatus," Copending Application U.S. Ser. No. 09/163,664, filed Sep. 30, 1998, with the named inventors Bing R. Hsieh, Kaiser H. Wong, and Tuan Anh Vo, entitled "Organic Overcoat for Electrode Grid," and Copending Application U.S. Serial No. 09/163,518, filed Sep. 30, 1998, with the named inventors Kaiser H. Wong and Tuan Anh Vo, entitled "Inorganic Overcoat for Particulate Transport Electrode Grid", the disclosures of each of which are totally incorporated herein by reference.

U.S. Pat. No. 5,834,080 (Mort et al.), the disclosure of which is totally incorporated herein by reference, discloses controllably conductive polymer compositions that may be used in electrophotographic imaging developing systems, such as scavengeless or hybrid scavengeless systems or liquid image development systems. The conductive polymer compositions includes a charge-transporting material (particularly a charge-transporting, thiophene-containing polymer or an inert elastomeric polymer, such as a butadiene- or isoprene-based copolymer or an aromatic polyether-based polyurethane elastomer, that additionally comprises charge transport molecules) and a dopant capable of accepting electrons from the charge-transporting material. The invention also relates to an electrophotographic printing machine, a developing apparatus, and a coated transport member, an intermediate transfer belt, and a hybrid compliant photoreceptor comprising a composition of the invention.

U.S. Pat. No. 5,853,906 (Hsieh), the disclosure of which is totally incorporated herein by reference, discloses a conductive coating comprising an oxidized oligomer salt, a charge transport component, and a polymer binder, for example, a conductive coating comprising an oxidized tetratolyidiamine salt of the formula

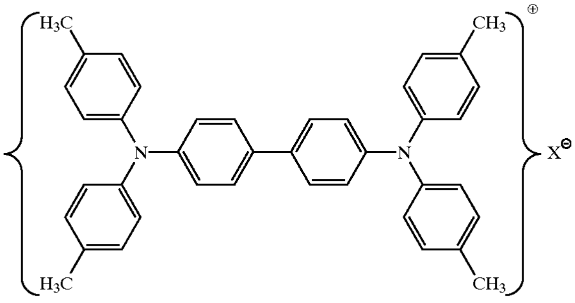

a charge transport component, and a polymer binder, wherein $X^-$ is a monovalent anion.

U.S. Pat. No. 5,457,001 (Van Ritter), the disclosure of which is totally incorporated herein by reference, discloses an electrically conductive toner powder, the separate particles of which contain thermoplastic resin, additives conventional in toner powders, such as coloring constituents and possibly magnetically attractable material, and an electrically conductive protonized polyaniline complex, the protonized polyaniline complex preferably having an electrical conductivity of at least 1 S/cm, the conductive complex being distributed over the volume of the toner particles or present in a polymer-matrix at the surface of the toner particles.

U.S. Pat. No. 5,202,211 (Vercoulen et al.), the disclosure of which is totally incorporated herein by reference, discloses a toner powder comprising toner particles which carry on their surface and/or in an edge zone close to the surface fine particles of electrically conductive material consisting of fluorine-doped tin oxide. The fluorine-doped tin oxide particles have a primary particle size of less than 0.2 micron and a specific electrical resistance of at most 50 ohms.meter. The fluorine content of the tin oxide is less than 10 percent by weight, and preferably is from 1 to 5 percent by weight.

U.S. Pat. No. 5,035,926 (Jonas et al.), the disclosure of which is totally incorporated herein by reference, discloses new polythiophenes containing structural units of the formula

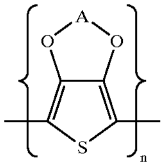

in which A denotes an optionally substituted $C_1$–$C_4$ alkylene radical, their preparation by oxidative polymerization of the corresponding thiophenes, and the use of the polythiophenes for imparting antistatic properties on substrates which only conduct electrical current poorly or not at all, in particular on plastic mouldings, and as electrode material for rechargeable batteries.

While known compositions and processes are suitable for their intended purposes, a need remains for improved marking processes. In addition, a need remains for improved ballistic aerosol marking materials and processes. Further, a need remains for ballistic aerosol marking materials and processes that enable the printing of very small pixels, enabling printing resolutions of 900 dots per inch or more. Additionally, there is a need for ballistic aerosol marking materials and processes in which the possibility of the marking material clogging the printing channels is reduced. There is also a need for ballistic aerosol marking processes wherein the marking material does not become undesirably charged. In addition, there is a need for ballistic aerosol marking processes wherein the marking material exhibits desirable flow properties. Further, there is a need for ballistic aerosol marking processes wherein the marking material contains particles of desirably small particle size and desirably narrow particle size distribution. Additionally, there is a need for ballistic aerosol marking processes wherein the marking material can obtain a low degree of surface charge without becoming so highly charged that the material becomes agglomerated or causes channel clogging. A need also remains for ballistic aerosol marking processes wherein the marking material is semi-conductive or conductive (as opposed to insulative) and capable of retaining electrostatic charge. In addition, a need remains for ballistic aerosol marking processes wherein the marking materials have sufficient conductivity to provide for inductive charging to enable toner transport and gating into the printing channels. Further, a need remains for ballistic aerosol marking processes wherein the marking materials can be selected to control the level of electrostatic charging and conductivity, thereby preventing charge build up in the BAM subsystems, controlling relative humidity, and maintaining excellent flow. Additionally, a need remains for ballistic aerosol marking processes wherein the marking materials have desirably low melting temperatures. There is also a need for ballistic aerosol marking processes wherein the marking materials have tunable melt and gloss properties, wherein the same monomers can be used to generate marking materials that have different melt and gloss characteristics by varying polymer characteristics such as molecular weight ($M_w$, $M_n$, $M_{WD}$, or the like) or crosslinking. In addition, there is a need for ballistic aerosol marking processes wherein the marking materials have desirable glass transition temperatures for enabling efficient transfer of the marking material from an intermediate transfer or transfuse member to a print substrate. Further, there is a need for ballistic aerosol marking processes wherein the marking materials have desirable glass transition temperatures for enabling efficient transfer of the marking material from a heated intermediate transfer or transfuse member to a print substrate. Additionally, there is a need for ballistic aerosol marking processes wherein the marking materials have a wide range of colors with desirable color characteristics. A need also remains for ballistic aerosol marking processes wherein the marking materials exhibit good transparency characteristics. In addition, a need remains for ballistic aerosol marking processes wherein the marking materials exhibit good fusing performance. Further, a need remains for ballistic aerosol marking processes wherein the marking material forms images with low toner pile heights, even for full color superimposed images. Additionally, a need remains for ballistic aerosol marking processes wherein the marking material comprises a resin particle encapsulated with a conductive polymer, wherein the conductive polymer is chemically bound to the particle surface. There is also a need for ballistic aerosol marking processes wherein the marking material comprises particles that have tunable morphology in that the particle shape can be selected to be spherical, highly irregular, or the like.

SUMMARY OF THE INVENTION

The present invention is directed to a process for depositing marking material onto a substrate which comprises (a) providing a propellant to a head structure, said head structure having at least one channel therein, said channel having an exit orifice with a width no larger than about 250 microns through which the propellant can flow, said propellant flowing through the channel to form thereby a propellant stream having kinetic energy, said channel directing the propellant stream toward the substrate, and (b) controllably introducing a particulate marking material into the propellant stream in the channel, wherein the kinetic energy of the propellant particle stream causes the particulate marking material to impact the substrate, and wherein the particulate marking material comprises toner particles which comprise a polyester resin, an optional colorant, and poly(3,4-ethylenedioxythiophene), said toner particles having an average particle diameter of no more than about 10 microns and a particle size distribution of GSD equal to no more than about 1.25, wherein said toner particles are prepared by an emulsion aggregation process, said toner particles having an average bulk conductivity of at least about $10^{-11}$ Siemens per centimeter.

DETAILED DESCRIPTION OF THE INVENTION

In the following detailed description, numeric ranges are provided for various aspects of the embodiments described, such as pressures, velocities, widths, lengths, and the like. These recited ranges are to be treated as examples only, and are not intended to limit the scope of the claims hereof. In addition, a number of materials are identified as suitable for various aspects of the embodiments, such as for marking materials, propellants, body structures, and the like. These recited materials are also to be treated as exemplary, and are not intended to limit the scope of the claims hereof.

Figure 1:
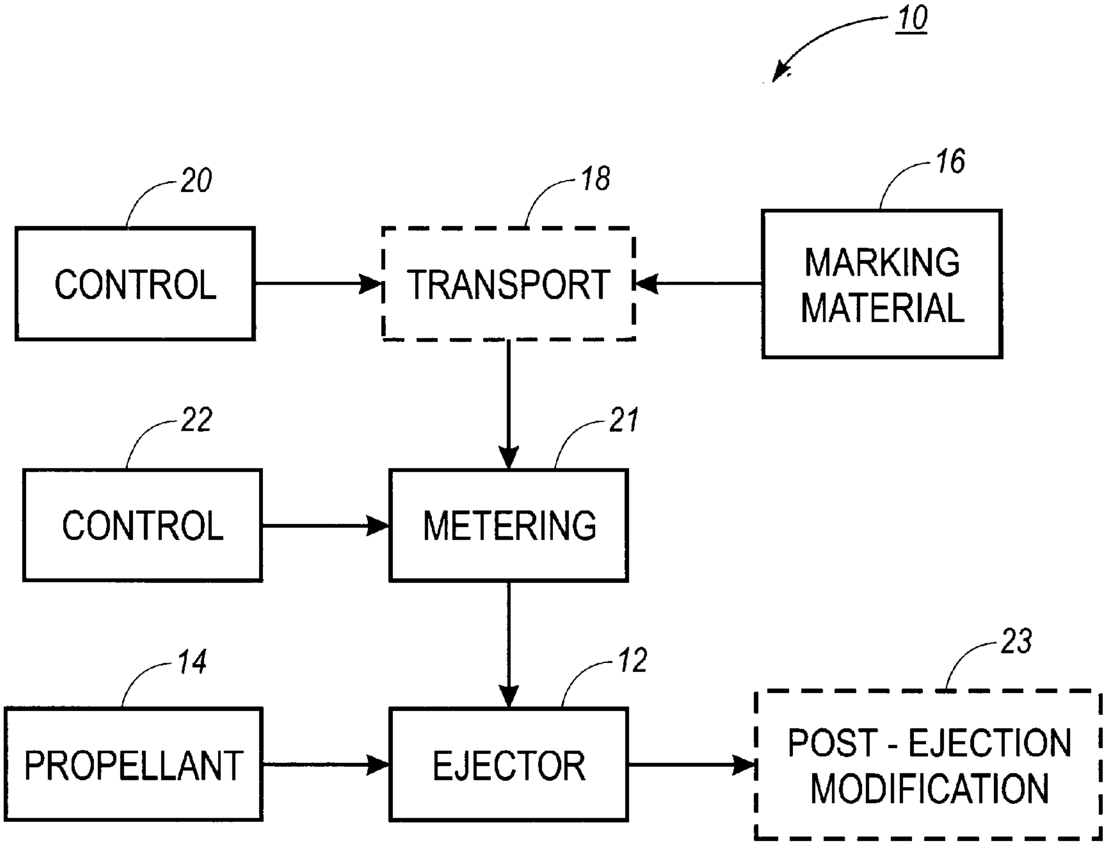
FIG. 1 is a schematic illustration of a system for marking a substrate according to the present invention.

With reference now to FIG. 1, shown therein is a schematic illustration of a ballistic aerosol marking device 10 according to one embodiment of the present invention. As shown therein, device 10 comprises one or more ejectors 12 to which a propellant 14 is fed. A marking material 16, which can be transported by a transport 18 under the command of control 20, is introduced into ejector 12. (Optional elements are indicated by dashed lines.) The marking material is metered (that is controllably introduced) into the ejector by metering device 21, under command of control 22. The marking material ejected by ejector 12 can be subject to post-ejection modification 23, optionally also part of device 10. Each of these elements will be described in further detail below. It will be appreciated that device 10 can form a part of a printer, for example of the type commonly attached to a computer network, personal computer or the like, part of a facsimile machine, part of a document duplicator, part of a labelling apparatus, or part of any other of a wide variety of marking devices.

Figure 2:
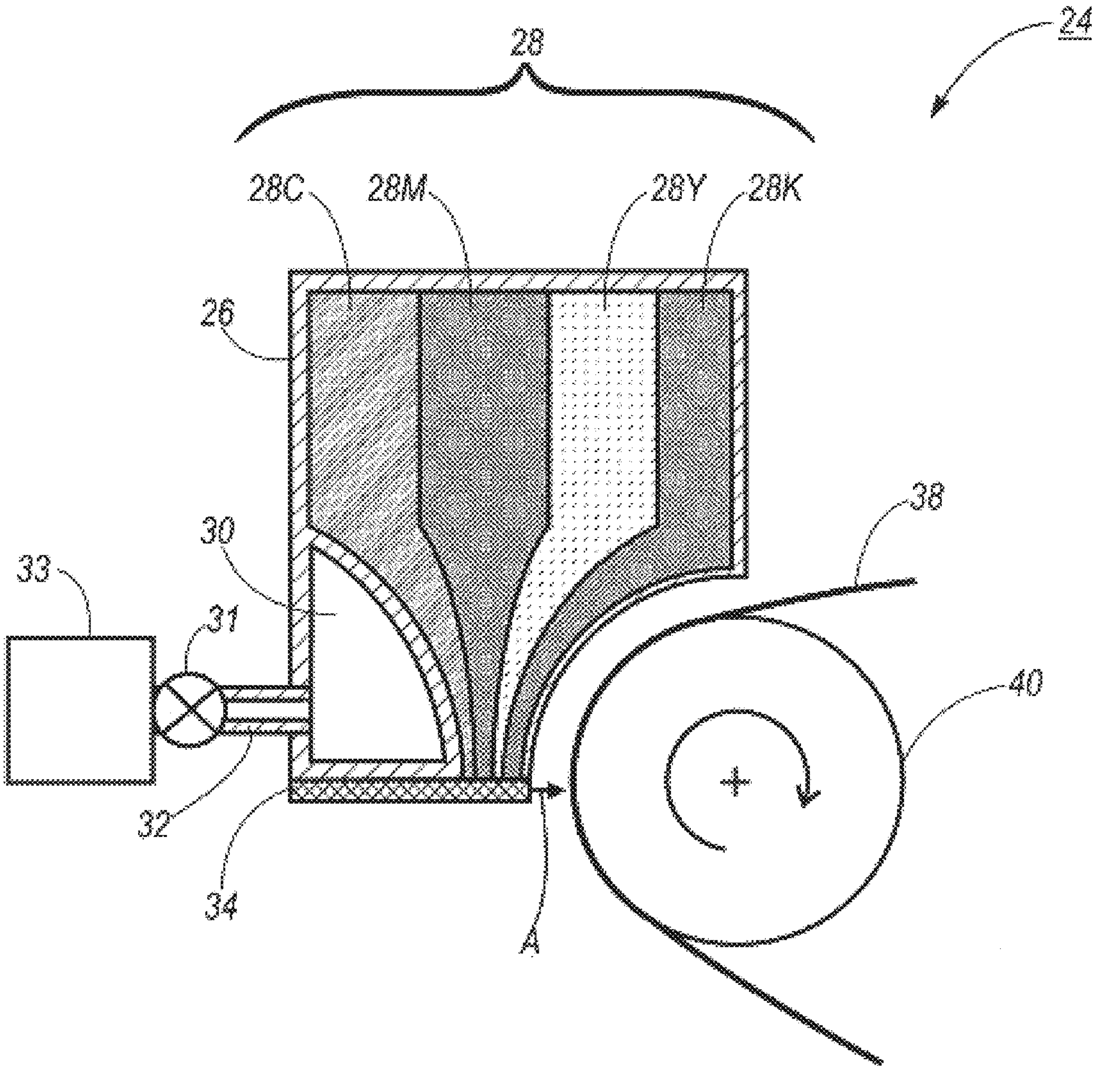
FIG. 2 is cross sectional illustration of a marking apparatus according to one embodiment of the present invention.

The embodiment illustrated in FIG. 1 can be realized by a ballistic aerosol marking device 24 of the type shown in the cut-away side view of FIG. 2. According to this embodiment, the materials to be deposited will be four colored marking materials, for example cyan (C), magenta (M), yellow (Y), and black (K), of a type described further herein, which can be deposited concomitantly, either mixed or unmixed, successively, or otherwise. While the illustration of FIG. 2 and the associated description contemplates a device for marking with four colors (either one color at a time or in mixtures thereof), a device for marking with a fewer or a greater number of colors, or other or additional materials, such as materials creating a surface for adhering marking material particles (or other substrate surface pre-treatment), a desired substrate finish quality (such as a matte, satin or gloss finish or other substrate surface post-treatment), material not visible to the unaided eye (such as magnetic particles, ultra violet-fluorescent particles, and the like) or other material associated with a marked substrate, is clearly contemplated herein.

Device 24 comprises a body 26 within which is formed a plurality of cavities 28C, 28M, 28Y, and 28K (collectively referred to as cavities 28) for receiving materials to be deposited. Also formed in body 26 can be a propellant cavity 30. A fitting 32 can be provided for connecting propellant cavity 30 to a propellant source 33 such as a compressor, a propellant reservoir, or the like. Body 26 can be connected to a print head 34, comprising, among other layers, substrate 36 and channel layer 37.

Figure 3:
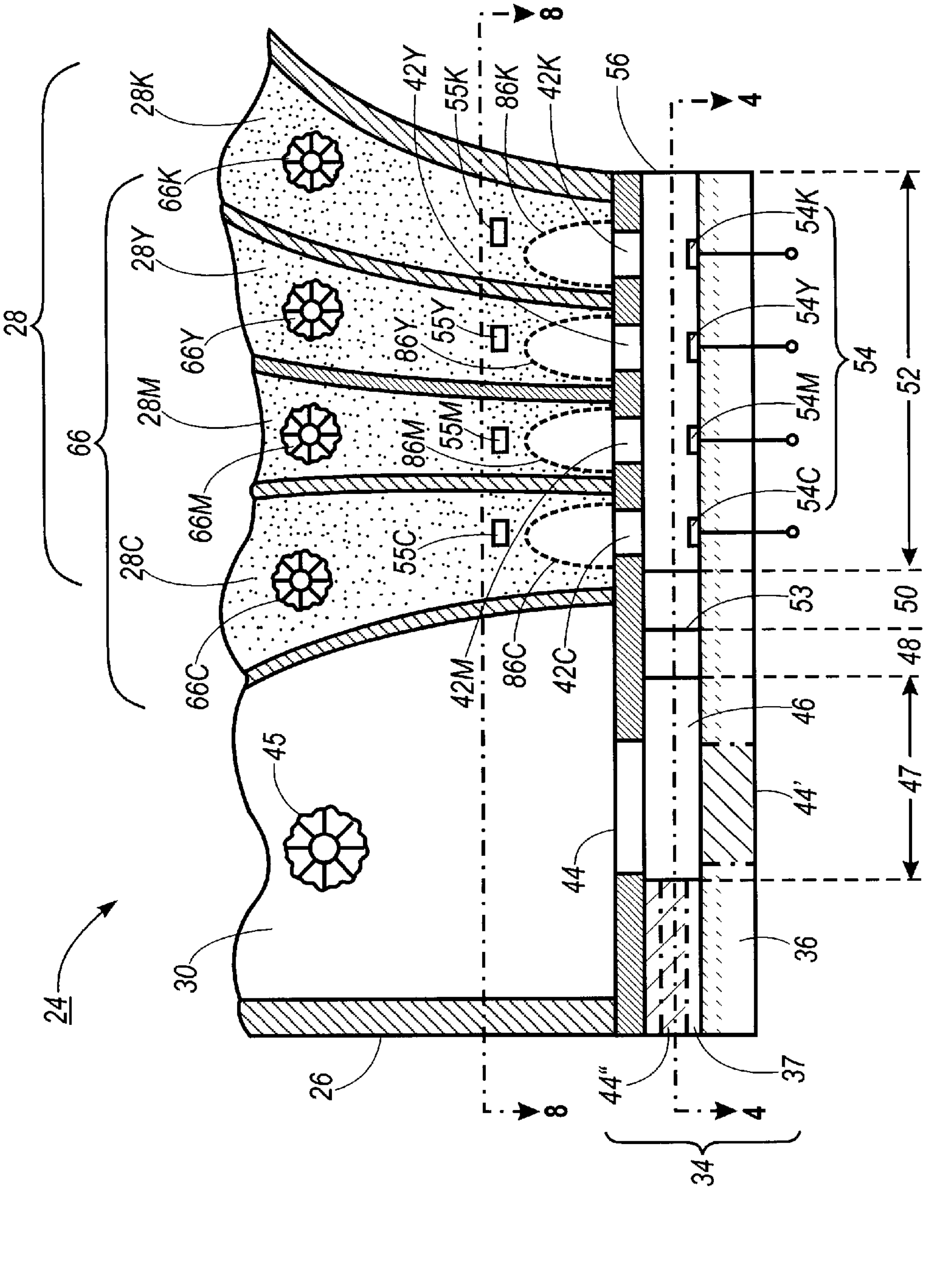
FIG. 3 is another cross sectional illustration of a marking apparatus according to one embodiment of the present invention.

With reference now to FIG. 3, shown therein is a cut-away cross section of a portion of device 24. Each of cavities 28 include a port 42C, 42M, 42Y, and 42K (collectively referred to as ports 42) respectively, of circular, oval, rectangular, or other cross-section, providing communication between said cavities, and a channel 46 which adjoins body 26. Ports 42 are shown having a longitudinal axis roughly perpendicular to the longitudinal axis of channel 46. The angle between the longitudinal axes of ports 42 and channel 46, however, can be other than 90 degrees, as appropriate for the particular application of the present invention.

Likewise, propellant cavity 30 includes a port 44, of circular, oval, rectangular, or other cross-section, between said cavity and channel 46 through which propellant can travel. Alternatively, print head 34 can be provided with a port 44' in substrate 36 or port 44" in channel layer 37, or combinations thereof, for the introduction of propellant into channel 46. As will be described further below, marking material is caused to flow out from cavities 28 through ports 42 and into a stream of propellant flowing through channel 46. The marking material and propellant are directed in the direction of arrow A toward a substrate 38, for example paper, supported by a platen 40, as shown in FIG. 2. It has been demonstrated that a propellant marking material flow pattern from a print head employing a number of the features described herein can remain relatively collimated for a distance of up to 10 millimeters, with an optimal printing spacing on the order of between one and several millimeters. For example, the print head can produce a marking material stream which does not deviate by more than about 20 percent, and preferably by not more than about 10 percent, from the width of the exit orifice for a distance of at least 4 times the exit orifice width. The appropriate spacing between the print head and the substrate, however, is a function of many parameters, and does not itself form a part of the present invention. In one preferred embodiment, the kinetic energy of the particles, which are moving at very high velocities toward the substrate, is converted to thermal energy upon impact of the particles on the substrate, thereby fixing or fusing the particles to the substrate. In this embodiment, the glass transition temperature of the resin in the particles is selected so that the thermal energy generated by impact with the substrate is sufficient to fuse the particles to the substrate; this process is called kinetic fusing.

According to one embodiment of the present invention, print head 34 comprises a substrate 36 and channel layer 37 in which is formed channel 46. Additional layers, such as an insulating layer, capping layer, or the like (not shown) can also form a part of print head 34. Substrate 36 is formed of a suitable material such as glass, ceramic, or the like, on which (directly or indirectly) is formed a relatively thick material, such as a thick permanent photoresist (for example, a liquid photosensitive epoxy such as SU-8, commercially available from Microlithography Chemicals, Inc.; see also U.S. Pat. No. 4,882,245, the disclosure of which is totally incorporated herein by reference) and/or a dry film-based photoresist such as the Riston photopolymer resist series, commercially available from DuPont Printed Circuit Materials, Research Triangle Park, N.C. which can be etched, machined, or otherwise in which can be formed a channel with features described below.

Figure 4:
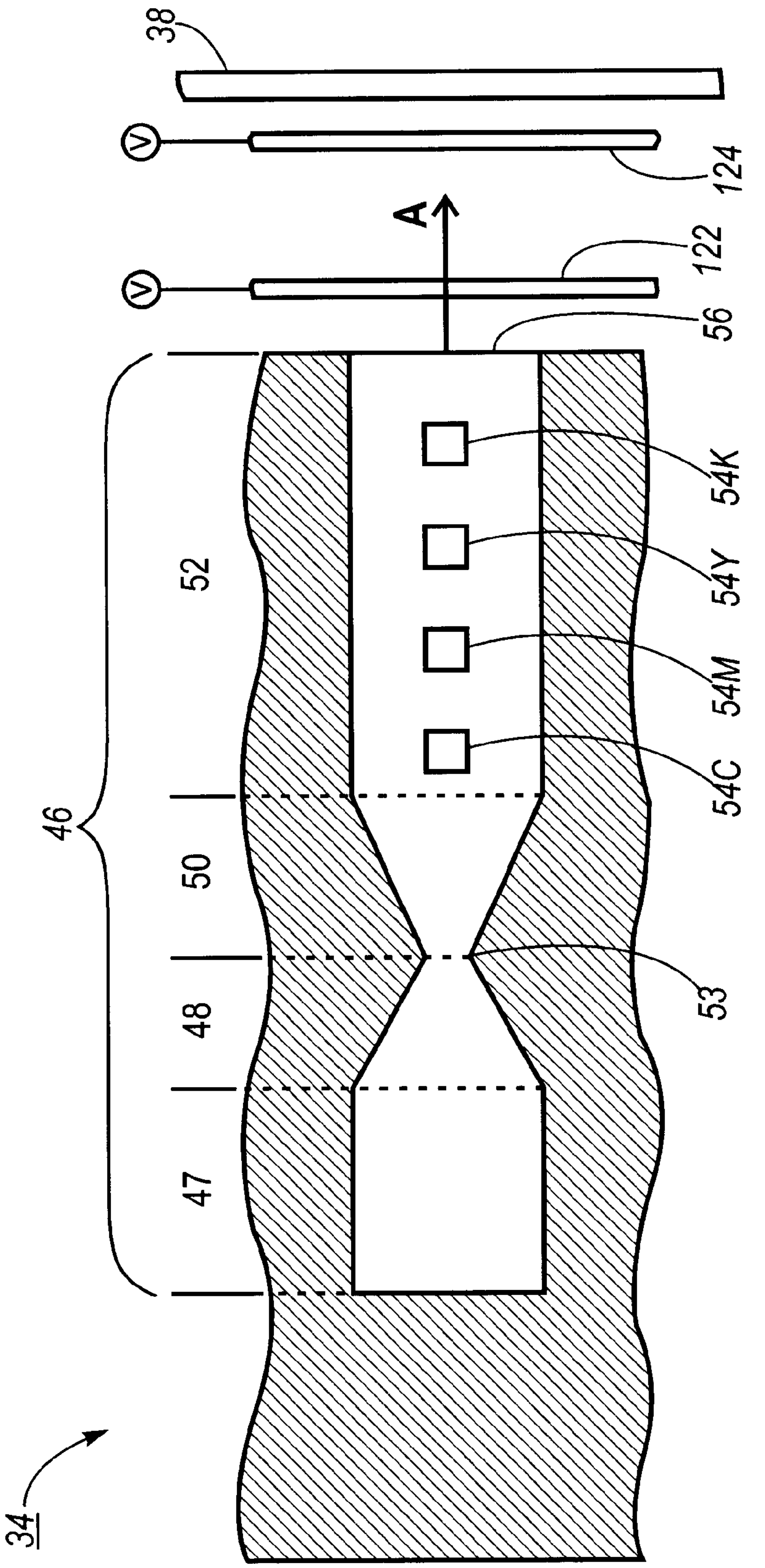
FIG. 4 is a plan view of one channel, with nozzle, of the marking apparatus shown in FIG. 3.

Referring now to FIG. 4, which is a cut-away plan view of print head 34, in one embodiment channel 46 is formed to have at a first, proximal end a propellant receiving region 47, an adjacent converging region 48, a diverging region 50, and a marking material injection region 52. The point of transition between the converging region 48 and diverging region 50 is referred to as throat 53, and the converging region 48, diverging region 50, and throat 53 are collectively referred to as a nozzle. The general shape of such a channel is sometimes referred to as a de Laval expansion pipe or a venturi convergence/divergence structure. An exit orifice 56 is located at the distal end of channel 46.

Figure 5A:
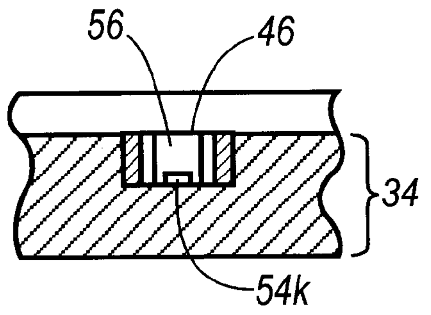
FIGS. 5A through 5C and 6A through 6C are cross sectional views, in the longitudinal direction, of several examples of channels according to the present invention.
Figure 5B:
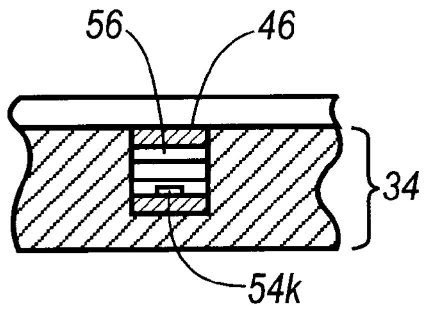
Figure 5C:
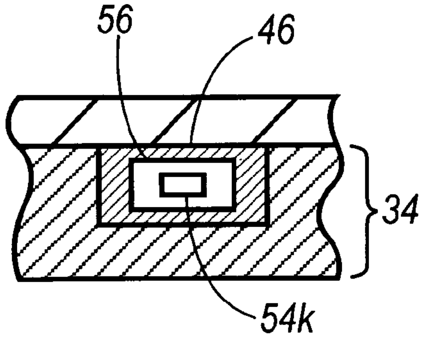
Figure 6A:
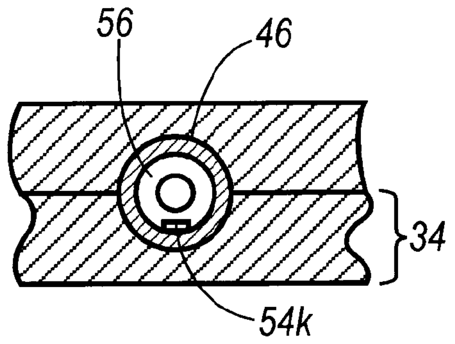
Figure 6B:
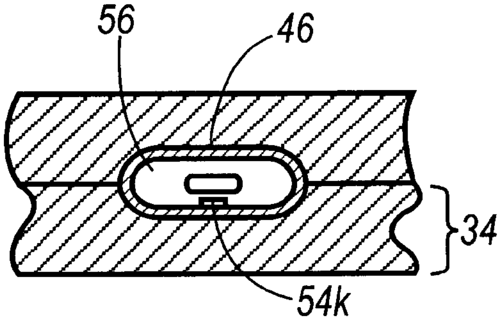
Figure 6C:
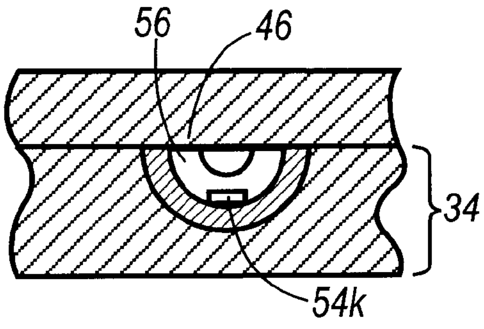

In the embodiment of the present invention shown in FIGS. 3 and 4, region 48 converges in the plane of FIG. 4, but not in the plane of FIG. 3, and likewise region 50 diverges in the plane of FIG. 4, but not in the plane of FIG. 3. Typically, this divergence determines the cross-sectional shape of the exit orifice 56. For example, the shape of orifice 56 illustrated in FIG. 5A corresponds to the device shown in FIGS. 3 and 4. However, the channel can be fabricated such that these regions converge/diverge in the plane of FIG. 3, but not in the plane of FIG. 4 (illustrated in FIG. 5B), or in both the planes of FIGS. 3 and 4 (illustrated in FIG. 5C), or in some other plane or set of planes, or in all planes (examples illustrated in FIGS. 6A–6C) as can be determined by the manufacture and application of the present invention.

Figure 7:
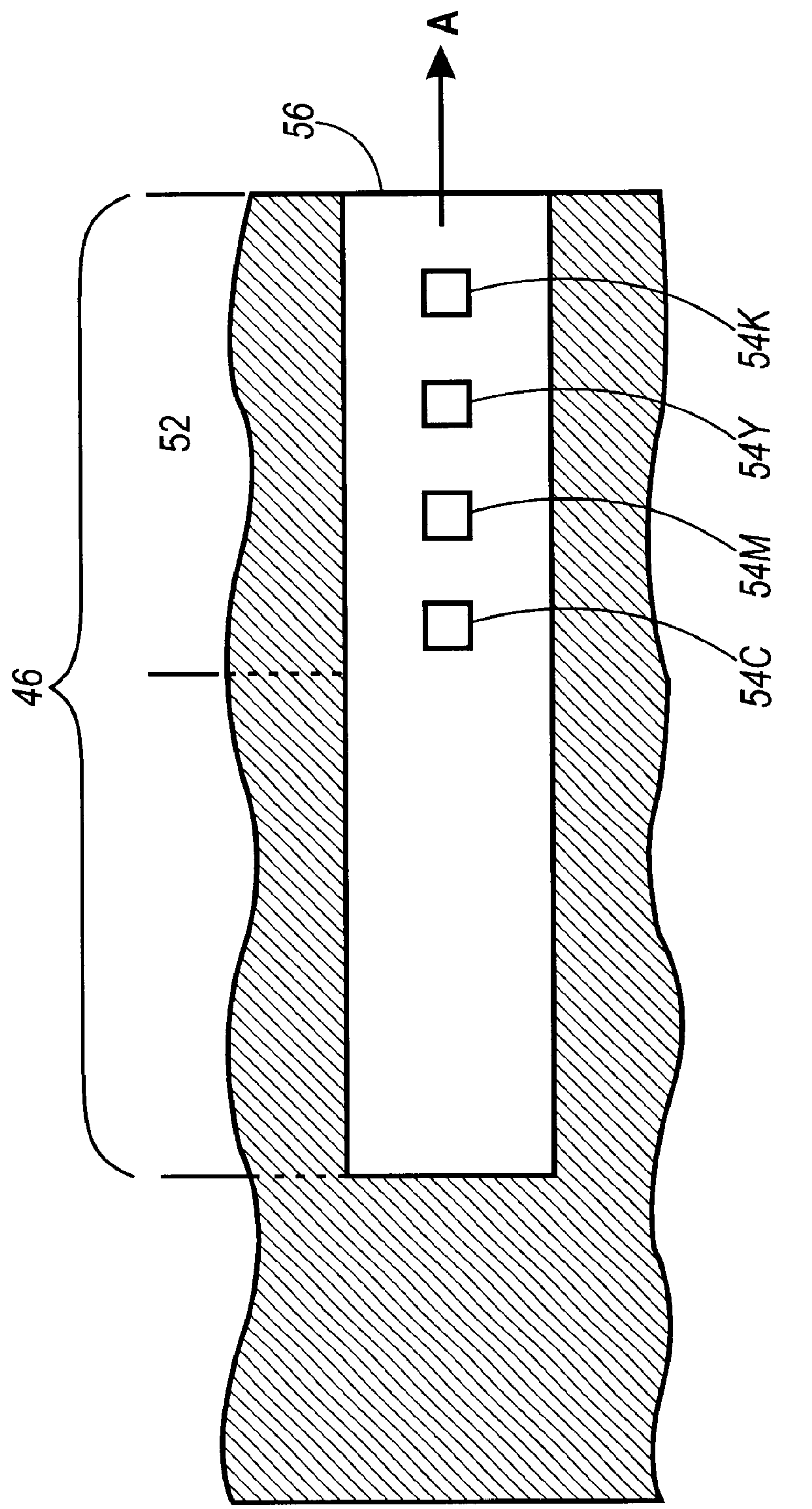
FIG. 7 is another plan view of one channel of a marking apparatus, without a nozzle, according to the present invention.
Figure 8A:
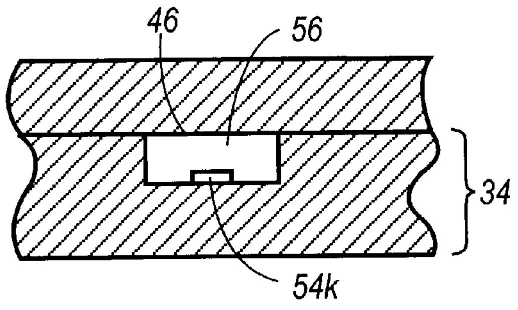
FIGS. 8A through 8D are cross sectional views, along the longitudinal axis, of several additional examples of channels according to the present invention.
Figure 8B:
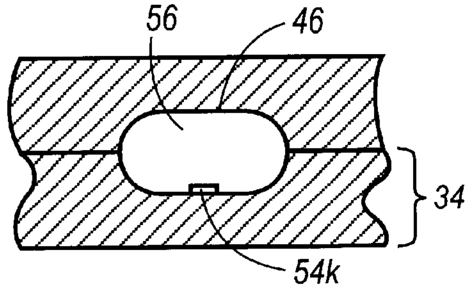
Figure 8C:
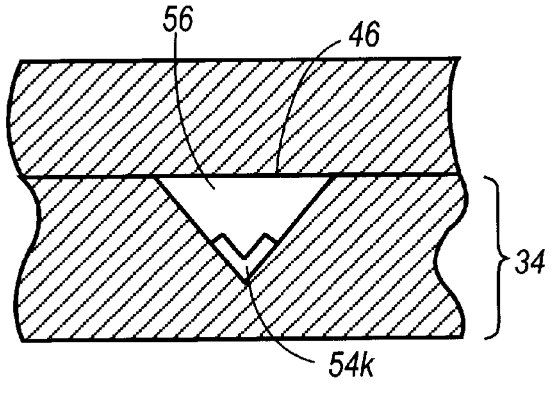
Figure 8D:
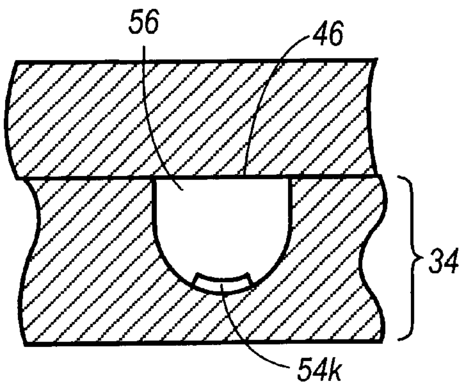

In another embodiment, shown in FIG. 7, channel 46 is not provided with a converging and diverging region, but rather has a uniform cross section along its axis. This cross section can be rectangular or square (illustrated in FIG. 8A), oval or circular (illustrated in FIG. 8B), or other cross section (examples are illustrated in FIGS. 8C–8D), as can be determined by the manufacture and application of the present invention.

Any of the aforementioned channel configurations or cross sections are suitable for the present invention. The de Laval or venturi configuration is, however, preferred because it minimizes spreading of the collimated stream of marking particles exiting the channel.

Referring again to FIG. 3, propellant enters channel 46 through port 44, from propellant cavity 30, roughly perpendicular to the long axis of channel 46. According to another embodiment, the propellant enters the channel parallel (or at some other angle) to the long axis of channel 46 by, for example, ports 44' or 44" or other manner not shown. The propellant can flow continuously through the channel while the marking apparatus is in an operative configuration (for example, a "power on" or similar state ready to mark), or can be modulated such that propellant passes through the channel only when marking material is to be ejected, as dictated by the particular application of the present invention. Such propellant modulation can be accomplished by a valve 31 interposed between the propellant source 33 and the channel 46, by modulating the generation of the propellant for example by turning on and off a compressor or selectively initiating a chemical reaction designed to generate propellant, or the like.

Marking material can controllably enter the channel through one or more ports 42 located in the marking material injection region 52. That is, during use, the amount of marking material introduced into the propellant stream can be controlled from zero to a maximum per spot. The propellant and marking material travel from the proximal end to a distal end of channel 46 at which is located exit orifice 56.

According to one embodiment for metering the marking material, the marking material includes material which can be imparted with an electrostatic charge. For example, the marking material can comprise a pigment suspended in a binder together with charge directors. The charge directors can be charged, for example by way of a corona 66C, 66M, 66Y, and 66K (collectively referred to as coronas 66), located in cavities 28, shown in FIG. 3. Another option is initially to charge the propellant gas, for example, by way of a corona 45 in cavity 30 (or some other appropriate location such as port 44 or the like.) The charged propellant can be made to enter into cavities 28 through ports 42, for the dual purposes of creating a fluidized bed 86C, 86M, 86Y, and 86K (collectively referred to as fluidized bed 86), and imparting a charge to the marking material. Other options include tribocharging, by other means external to cavities 28, or other mechanism.

Formed at one surface of channel 46, opposite each of the ports 42 are electrodes 54C, 54M, 54Y, and 54K (collectively referred to as electrodes 54). Formed within cavities 28 (or some other location such as at or within ports 44) are corresponding counter-electrodes 55C, 55M, 55Y, and 55K (collectively referred to as counter-electrodes 55). When an electric field is generated by electrodes 54 and counter-electrodes 55, the charged marking material can be attracted to the field, and exits cavities 28 through ports 42 in a direction roughly perpendicular to the propellant stream in channel 46. Alternatively, when an electric field is generated by electrodes 54 and counter-electrodes 55, a charge can be induced on the marking material, provided that the marking material has sufficient conductivity, and can be attracted to the field, and exits cavities 28 through ports 42 in a direction roughly perpendicular to the propellant stream in channel 46. In either embodiment, the shape and location of the electrodes and the charge applied thereto determine the strength of the electric field, and accordingly determine the force of the injection of the marking material into the propellant stream. In general, the force injecting the marking material into the propellant stream is chosen such that the momentum provided by the force of the propellant stream on the marking material overcomes the injecting force, and once into the propellant stream in channel 46, the marking material travels with the propellant stream out of exit orifice 56 in a direction towards the substrate.

In the event that fusing assistance is required (for example, when an elastic substrate is used, when the marking material particle velocity is low, or the like), a number of approaches can be employed. For example, one or more heated filaments 122 can be provided proximate the ejection port 56 (shown in FIG. 4), which either reduces the kinetic energy needed to melt the marking material particle or in fact at least partly melts the marking material particle in flight. Alternatively, or in addition to filament 122, a heated filament 124 can be located proximate substrate 38 (also shown in FIG. 4) to have a similar effect.

While FIGS. 4 to 8 illustrate a print head 34 having one channel therein, it will be appreciated that a print head according to the present invention can have an arbitrary number of channels, and range from several hundred micrometers across with one or several channels, to a page-width (for example, 8.5 or more inches across) with thousands of channels. The width of each exit orifice 56 can be on the order of 250 μm or smaller, preferably in the range of 100 μm or smaller. The pitch, or spacing from edge to edge (or center to center) between adjacent exit orifices 56 can also be on the order of 250 μm or smaller, preferably in the range of 100 μm or smaller in non-staggered array. In a two-dimensionally staggered array, the pitch can be further reduced.

The marking materials of the present invention comprise toner particles typically having an average particle diameter of no more than about 10 microns, preferably no more than about 7 microns, and more preferably no more than about 6.5 microns, although the particle size can be outside of these ranges, and typically have a particle size distribution of GSD equal to no more than about 1.25, preferably no more than about 1.23, and more preferably no more than about 1.20, although the particle size distribution can be outside of these ranges. The toner particles comprise a polyester resin, an optional colorant, and poly(3,4-ethylenedioxythiophene).

In some embodiments, the resin is selected so that the resin glass transition temperature is such as to enable kinetic fusing. If the velocity of the toner particles upon impact with the substrate is known, the value of the $T_g$ required to enable kinetic fusing can be calculated as follows:

The critical impact velocity $v_c$ required to melt the toner particle kinetically is estimated for a collision with an infinitely stiff substrate. The kinetic energy $E_k$ of a spherical particle with velocity v, density ρ, and diameter d is:

$$E_k = \frac{\pi \cdot \rho \cdot d^3 \cdot v^2}{12}$$

The energy $E_m$ required to heat a spherical particle with diameter d, heat capacity $C_p$, and density ρ from room temperature $T_o$ to beyond its glass transition temperature $T_g$ is:

$$E_m = \frac{\pi \cdot \rho \cdot d^3 \cdot C_p \cdot (T_g - T_0)}{6}$$

The energy $E_p$ required to deform a particle with diameter d and Young's modulus E beyond its elasticity limit $\sigma_e$ and into the plastic deformation regime is:

$$E_p = \frac{d^3 \cdot \sigma_e^2}{2E}$$

For kinetic fusing (melting the particle by plastic deformation from the collision with an infinitely stiff substrate), the kinetic energy of the incoming particle should be large enough to bring the particle beyond its elasticity limit. In addition, if the particle is taken beyond its elasticity limit, kinetic energy is transformed into heat through plastic deformation of the particle. If it is assumed that all kinetic energy is transformed into heat, the particle will melt if the kinetic energy ($E_k$) is larger than the heat required to bring the particle beyond its glass transition temperature ($E_m$). The critical velocity for obtaining plastic deformation ($V_{cp}$) can be calculated by equating $E_k$ to $E_p$:

$$v_{cp} = \sqrt{\frac{6}{\pi \rho E}} \cdot \sigma_e$$

Note that this expression is independent of particle size. Some numerical examples (Source: CRC Handbook) include:

| Material | E (Pa) | ρ (kg/m$^3$) | $\sigma_e$(Pa) | $v_{cp}$ (m/s) |
|---|---|---|---|---|
| Steel | 200E9 | 8,000 | 700E6 | 25 |
| Polyethyene | 140E6 | 900 | 7E6 | 28 |
| Neoprene | 3E6 | 1,250 | 20E6 | 450 |
| Lead | 13E9 | 11,300 | 14E6 | 1.6 |

Most thermoplastic materials (such as polyethylene) require an impact velocity on the order of a few tens of meters per second to achieve plastic deformation from the collision with an infinitely stiff wall. Velocities on the order of several hundred of meters per second are achieved in ballistic aerosol marking processes. The critical velocity for kinetic melt ($V_{cm}$) can be calculated by equating $E_k$ to $E_m$:

$$v_{cm} = \sqrt{2.C_p.(T_g - T_o)}$$

Note that this expression is independent of particle size and density. For example, for a thermoplastic material with $C_p$=1000 J/kg.K and $T_g$=60° C., $T_o$=20° C., the critical velocity $V_{cm}$ to achieve kinetic melt is equal to 280 meters per second, which is in the order of magnitude of the ballistic aerosol velocities (typically from about 300 to about 350 meters per second).

The marking materials of the present invention comprise toner particles comprising a polyester resin and an optional colorant. The resin can be a homopolymer of one ester monomer or a copolymer of two or more ester monomers. Examples of suitable resins include polyethylene terephthalate, polypropylene terephthalate, polybutylene terephthalate, polypentylene terephthalate, polyhexalene terephthalate, polyheptadene terephthalate, polyoctalene-terephthalate, poly(propylene-diethylene terephthalate), poly(bisphenol A-fumarate), poly(bisphenol A-terephthalate), copoly(bisphenol A-terephthalate)-copoly (bisphenol A-fumarate), poly(neopentyl-terephthalate), sulfonated polyesters such as those disclosed in U.S. Pat. No. 5,348,832, U.S. Pat. No. 5,593,807, U.S. Pat. No. 5,604,076, U.S. Pat. No. 5,648,193, U.S. Pat. No. 5,658,704, U.S. Pat. No. 5,660,965, U.S. Pat. No. 5,840,462, U.S. Pat. No. 5,853,944, U.S. Pat. No. 5,916,725, U.S. Pat. No. 5,919,595, U.S. Pat. No. 5,945,245, U.S. Pat. No. 6,054,240, U.S. Pat. No. 6,017,671, U.S. Pat. No. 6,020,101, Copending Application U.S. Ser. No. 08/221,595, Copending Application U.S. Ser. No. 09/657,340, Copending Application U.S. Ser. No. 09/415,074, and Copending Application U.S. Ser. No. 09/624,532, the disclosures of each of which are totally incorporated herein by reference, including salts (such as metal salts, including aluminum salts, salts of alkali metals such as sodium, lithium, and potassium, salts of alkaline earth metals such as beryllium, magnesium, calcium, and barium, metal salts of transition metals, such as scandium, yttrium, titanium, zirconium, hafnium, vanadium, chromium, niobium, tantalum, molybdenum, tungsten, manganese, rhenium, iron, ruthenium, osmium, cobalt, rhodium, iridium, nickel, palladium, copper, platinum, silver, gold, zinc, cadmium, mercury, and the like, salts of lanthanide materials, and the like, as well as mixtures thereof) of poly(1,2-propylene-5-sulfoisophthalate), poly (neopentylene-5-sulfoisophthalate), poly(diethylene-5-sulfoisophthalate), copoly( 1,2-propylene-5-sulfoisophthalate)-copoly-(1,2-propylene-terephthalate phthalate), copoly(1,2-propylene-diethylene-5-sulfoisophthalate)-copoly-(1,2-propylene-diethylene-terephthalate phthalate), copoly(ethylene-neopentylene-5-sulfoisophthalate)-copoly-(ethylene-neopentylene-terephthalate-phthalate), copoly(propoxylated bisphenol A)-copoly-(propoxylated bisphenol A-5-sulfoisophthalate), copoly(ethylene-terephthalate)-copoly-(ethylene-5-sulfo-isophthalate), copoly(propylene-terephthalate)-copoly-(propylene-5-sulfo-isophthalate), copoly(diethylene-terephthalate)-copoly-(diethylene-5-sulfo-isophthalate), copoly(propylene-diethylene-terephthalate)-copoly-(propylene-diethylene-5-sulfoisophthalate), copoly (propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), copoly(ethoxylated bisphenol-A-maleate)-copoly(ethoxylated bisphenol-A-5-sulfo-isophthalate), copoly(propylene-diethylene terephthalate)-copoly (propylene-5-sulfoisophthalate), copoly(neopentyl-terephthalate)-copoly-(neopentyl-5-sulfoisophthalate), and the like, as well as mixtures thereof. Some examples of suitable polyesters include those of the formula

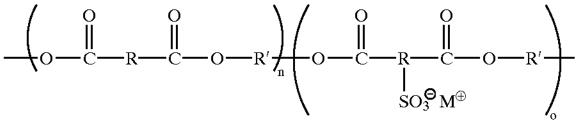

wherein M is hydrogen, an ammonium ion, or a metal ion, R is an alkylene group, typically with from 1 to about 25 carbon atoms, although the number of carbon atoms can be outside of this range, or an arylene group, typically with from 6 to about 24 carbon atoms, although the number of carbon atoms can be outside of this range, R' is an alkylene group, typically with from 1 to about 25 carbon atoms, although the number of carbon atoms can be outside of this range, or an oxyalkylene group, typically with from 1 to about 20 carbon atoms, although the number of carbon atoms can be outside of this range, n and o each represent the mole percent of monomers, wherein n+o=100, and preferably wherein n is from about 92 to about 95.5 and o is from about 0.5 to about 8, although the values of n and o can be outside of these ranges. Also suitable are those of the formula

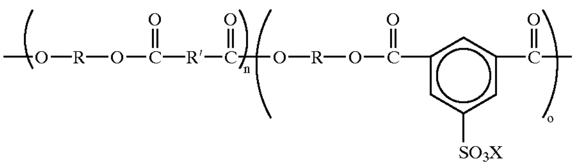

wherein X is hydrogen, an ammonium ion, or a metal ion, R is an alkylene or oxyalkylene group, typically with from about 2 to about 25 carbon atoms, although the number of carbon atoms can be outside of this range, R' is an arylene or oxyarylene group, typically with from 6 to about 36 carbon atoms, although the number of carbon atoms can be outside of this range, and n and o each represent the numbers of randomly repeating segments. Also suitable are those of the formula

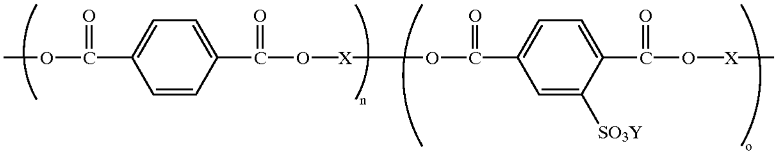

wherein X is a metal ion, X represents an alkyl group derived from a glycol monomer, with examples of suitable glycols including neopentyl glycol, ethylene glycol, propylene glycol, butylene glycol, diethylene glycol, dipropylene glycol, or the like, as well as mixtures thereof, and n and o each represent the numbers of randomly repeating segments. Preferably, the polyester has a weight average molecular weight of from about 2,000 to about 100,000, a number average molecular weight of from about 1,000 to about 50,000, and a polydispersity of from about 2 to about 18 (as measured by gel permeation chromatography), although the weight average and number average molecular weight values and the polydispersity value can be outside of these ranges.

The resin is present in the toner particles in any desired or effective amount, typically at least about 75 percent by weight of the toner particles, and preferably at least about 85 percent by weight of the toner particles, and typically no more than about 99 percent by weight of the toner particles, and preferably no more than about 98 percent by weight of the toner particles, although the amount can be outside of these ranges.

Examples of suitable optional colorants include dyes and pigments, such as carbon black (for example, REGAL 330®), magnetites, phthalocyanines, HELIOGEN BLUE L6900, D6840, D7080, D7020, PYLAM OIL BLUE, PYLAM OIL YELLOW, and PIGMENT BLUE 1, all available from Paul Uhlich & Co., PIGMENT VIOLET 1, PIGMENT RED 48, LEMON CHROME YELLOW DCC 1026, E.D. TOLUIDINE RED, and BON RED C, all available from Dominion Color Co., NOVAPERM YELLOW FGL and HOSTAPERM PINK E, available from Hoechst, CINQUASIA MAGENTA, available from E.I. DuPont de Nemours & Company, 2,9-dimethyl-substituted quinacridone and anthraquinone dyes identified in the Color Index as CI 60710, CI Dispersed Red 15, diazo dyes identified in the Color Index as CI 26050, CI Solvent Red 19, copper tetra (octadecyl sulfonamido) phthalocyanine, x-copper phthalocyanine pigment listed in the Color Index as CI 74160, CI Pigment Blue, Anthrathrene Blue, identified in the Color Index as CI 69810, Special Blue X-2137, diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, Permanent Yellow FGL, Pigment Yellow 74, B 15:3 cyan pigment dispersion, commercially available from Sun Chemicals, Magenta Red 81:3 pigment dispersion, commercially available from Sun Chemicals, Yellow 180 pigment dispersion, commercially available from Sun Chemicals, colored magnetites, such as mixtures of MAPICO BLACK® and cyan components, and the like, as well as mixtures thereof. Other commercial sources of pigments available as aqueous pigment dispersion from either Sun Chemical or Ciba include (but are not limited to) Pigment Yellow 17, Pigment Yellow 14, Pigment Yellow 93, Pigment Yellow 74, Pigment Violet 23, Pigment Violet 1, Pigment Green 7, Pigment Orange 36, Pigment Orange 21, Pigment Orange 16, Pigment Red 185, Pigment Red 122, Pigment Red 81:3, Pigment Blue 15:3, and Pigment Blue 61, and other pigments that enable reproduction of the maximum Pantone color space. Mixtures of colorants can also be employed. When present, the optional colorant is present in the toner particles in any desired or effective amount, typically at least about 1 percent by weight of the toner particles, and preferably at least about 2 percent by weight of the toner particles, and typically no more than about 25 percent by weight of the toner particles, and preferably no more than about 15 percent by weight of the toner particles, depending on the desired particle size, although the amount can be outside of these ranges.

The toner particles optionally can also contain charge control additives, such as alkyl pyridinium halides, including cetyl pyridinium chloride and others as disclosed in U.S. Pat. No. 4,298,672, the disclosure of which is totally incorporated herein by reference, sulfates and bisulfates, including distearyl dimethyl ammonium methyl sulfate as disclosed in U.S. Pat. No. 4,560,635, the disclosure of which is totally incorporated herein by reference, and distearyl dimethyl ammonium bisulfate as disclosed in U.S. Pat. No. 4,937,157, U.S. Pat. No. 4,560,635, and copending application Ser. No. 07/396,497, the disclosures of each of which are totally incorporated herein by reference, zinc 3,5-di-tert-butyl salicylate compounds, such as Bontron E-84, available from Orient Chemical Company of Japan, or zinc compounds as disclosed in U.S. Pat. No. 4,656,112, the disclosure of which is totally incorporated herein by reference, aluminum 3,5-di-tert-butyl salicylate compounds, such as Bontron E-88,. available from Orient Chemical Company of Japan, or aluminum compounds as disclosed in U.S. Pat. No. 4,845,003, the disclosure of which is totally incorporated herein by reference, charge control additives as disclosed in U.S. Pat. No. 3,944,493, U.S. Pat. No. 4,007,293, U.S. Pat. No. 4,079,014, U.S. Pat. No. 4,394,430, U.S. Pat. No. 4,464,452, U.S. Pat. No. 4,480,021, and U.S. Pat. No. 4,560,635, the disclosures of each of which are totally incorporated herein by reference, and the like, as well as mixtures thereof. Charge control additives are present in the toner particles in any desired or effective amounts, typically at least about 0.1 percent by weight of the toner particles, and typically no more than about 5 percent by weight of the toner particles, although the amount can be outside of this range.

Examples of optional external surface additives include metal salts, metal salts of fatty acids, colloidal silicas, and the like, as well as mixtures thereof. External additives are present in any desired or effective amount, typically at least about 0.1 percent by weight of the toner particles, and typically no more than about 2 percent by weight of the toner particles, although the amount can be outside of this range, as disclosed in, for example, U.S. Pat. No. 3,590,000, U.S. Pat. No. 3,720,617, U.S. Pat. No. 3,655,374 and U.S. Pat. No. 3,983,045, the disclosures of each of which are totally incorporated herein by reference. Preferred additives include zinc stearate and AEROSIL R812® silica as flow aids, available from Degussa. The external additives can be added during the aggregation process or blended onto the formed particles.

The toner particles of the present invention are prepared by an emulsion aggregation process. This process entails (1) preparing a colorant (such as a pigment) dispersion in a solvent (such as water), which dispersion comprises a colorant, a first ionic surfactant, and an optional charge control agent; (2) shearing the colorant dispersion with a latex mixture comprising (a) a counterionic surfactant with a charge polarity of opposite sign to that of said first ionic surfactant, (b) a nonionic surfactant, and (c) a resin, thereby causing flocculation or heterocoagulation of formed particles of colorant, resin, and optional charge control agent to form electrostatically bound aggregates, and (3) heating the electrostatically bound aggregates to form stable aggregates of at least about 1 micron in average particle diameter. Toner particle size is typically at least about 1 micron and typically no more than about 7 microns, although the particle size can be outside of this range. Heating can be at a temperature typically of from about 5 to about 50° C. above the resin glass transition temperature, although the temperature can be outside of this range, to coalesce the electrostatically bound aggregates, thereby forming toner particles comprising resin, optional colorant, and optional charge control agent. Alternatively, heating can be first to a temperature below the resin glass transition temperature to form electrostatically bound micron-sized aggregates with a narrow particle size distribution, followed by heating to a temperature above the resin glass transition temperature to provide coalesced micron-sized marking toner particles comprising resin, optional colorant, and optional charge control agent.

The coalesced particles differ from the uncoalesced aggregates primarily in morphology; the uncoalesced particles have greater surface area, typically having a "grape cluster" shape, whereas the coalesced particles are reduced in surface area, typically having a "potato" shape or even a spherical shape. The particle morphology can be controlled by adjusting conditions during the coalescence process, such as pH, temperature, coalescence time, and the like. Optionally, an additional amount of an ionic surfactant (of the same polarity as that of the initial latex) or nonionic surfactant can be added to the mixture prior to heating to minimize subsequent further growth or enlargement of the particles, followed by heating and coalescing the mixture. Subsequently, the toner particles are washed extensively to remove excess water soluble surfactant or surface absorbed surfactant, and are then dried to produce (optionally colored) polymeric toner particles. An alternative process entails using a flocculating or coagulating agent such as poly(aluminum chloride) instead of a counterionic surfactant of opposite polarity to the ionic surfactant in the latex formation; in this process, the growth of the aggregates can be slowed or halted by adjusting the solution to a more basic pH (typically at least about 7 or 8, although the pH can be outside of this range), and, during the coalescence step, the solution can, if desired, be adjusted to a more acidic pH to adjust the particle morphology. The coagulating agent typically is added in an acidic solution (for example, a 1 molar nitric acid solution) to the mixture of ionic latex and dispersed optional colorant, and during this addition step the viscosity of the mixture increases. Thereafter, heat and stirring are applied to induce aggregation and formation of micron-sized particles. When the desired particle size is achieved, this size can be frozen by increasing the pH of the mixture, typically to from about 7 to about 8, although the pH can be outside of this range. Thereafter, the temperature of the mixture can be increased to the desired coalescence temperature, typically from about 80 to about 95° C., although the temperature can be outside of this range. Subsequently, the particle morphology can be adjusted by dropping the pH of the mixture, typically to values of from about 4.5 to about 7, although the pH can be outside of this range.

When particles are prepared without a colorant, the latex (usually around 40 percent solids) is diluted to the right solids loading (of around 12 to 15 percent by weight solids) and then under identical shearing conditions the counterionic surfactant or polyaluminum chloride is added until flocculation or heterocoagulation takes place.

Examples of suitable ionic surfactants include anionic surfactants, such as sodium dodecylsulfate, sodium dodecylbenzene sulfonate, sodium dodecyinaphthalenesulfate, dialkyl benzenealkyl sulfates and sulfonates, abitic acid, NEOGEN R® and NEOGEN SC® available from Kao, DOWFAX®, available from Dow Chemical Co., and the like, as well as mixtures thereof. Anionic surfactants can be employed in any desired or effective amount, typically at least about 0.01 percent by weight of monomers used to prepare the copolymer resin, and preferably at least about 0.1 percent by weight of monomers used to prepare the copolymer resin, and typically no more than about 10 percent by weight of monomers used to prepare the copolymer resin, and preferably no more than about 5 percent by weight of monomers used to prepare the copolymer resin, although the amount can be outside of these ranges.

Examples of suitable ionic surfactants also include cationic surfactants, such as dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, and $C_{17}$ trimethyl ammonium bromides, halide salts of quaternized polyoxyethylalkylamines, dodecylbenzyl triethyl ammonium chloride, MIRAPOL® and ALKAQUAT® (available from Alkaril Chemical Company), SANIZOL® (benzalkonium chloride, available from Kao Chemicals), and the like, as well as mixtures thereof. Cationic surfactants can be employed in any desired or effective amounts, typically at least about 0.1 percent by weight of water, and typically no more than about 5 percent by weight of water, although the amount can be outside of this range. Preferably the molar ratio of the cationic surfactant used for flocculation to the anionic surfactant used in latex preparation from about 0.5:1 to about 4:1, and preferably from about 0.5:1 to about 2:1, although the relative amounts can be outside of these ranges.

Examples of suitable nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol (available from Rhone-Poulenc as IGEPAL CA-210®, IGEPAL CA-520®, IGEPAL CA-720®, IGEPAL CO-890®, IGEPAL CO-720®, IGEPAL CO-290®, IGEPAL CA-210®, ANTAROX 890® and ANTAROX 897®, and the like, as well as mixtures thereof. The nonionic surfactant can be present in any desired or effective amount, typically at least about 0.01 percent by weight of monomers used to prepare the copolymer resin, and preferably at least about 0.1 percent by weight of monomers used to prepare the copolymer resin, and typically no more than about 10 percent by weight of monomers used to prepare the copolymer resin, and preferably no more than about 5 percent by weight of monomers used to prepare the copolymer resin, although the amount can be outside of these ranges.

In embodiments of the present invention wherein the polyester resin is a sulfonated polyester (wherein some of the repeat monomer units of the polymer have sulfonate groups thereon), one preferred emulsion aggregation process comprises admixing a colloidal solution of sulfonated polyester resin with the colorant, followed by adding to the mixture a coalescence agent comprising an ionic metal salt, and subsequently isolating, filtering, washing, and drying the resulting toner particles. In a specific embodiment, the process comprises (i) mixing a colloidal solution of a sodio-sulfonated polyester resin with a particle size of from about 10 to about 80 nanometers, and preferably from about 10 to about 40 nanometers, and colorant; (ii) adding thereto an aqueous solution containing from about 1 to about 10 percent by weight in water at neutral pH of a coalescence agent comprising an ionic salt of a metal, such as the Group 2 metals (such as beryllium, magnesium, calcium, barium, or the like) or the Group 13 metals (such as aluminum, gallium, indium, or thallium) or the transition metals of Groups 3 to 12 (such as zinc, copper, cadmium, manganese, vanadium, nickel, niobium, chromium, iron, zirconium, scandium, or the like), with examples of suitable anions including halides (fluoride, chloride, bromide, or iodide), acetate, sulfate, or the like; and (iii) isolating and, optionally, washing and/or drying the resulting toner particles. In embodiments wherein uncolored particles are desired, the colorant is omitted from the preparation.

The emulsion aggregation process suitable for making the toner materials for the present invention has been disclosed in previous U.S. patents. For example, U.S. Pat. No. 5,290,654 (Sacripante et al.), the disclosure of which is totally incorporated herein by reference, discloses a process for the preparation of toner compositions which comprises dissolving a polymer, and, optionally a pigment, in an organic solvent; dispersing the resulting solution in an aqueous medium containing a surfactant or mixture of surfactants; stirring the mixture with optional heating to remove the organic solvent, thereby obtaining suspended particles of about 0.05 micron to about 2 microns in volume diameter; subsequently homogenizing the resulting suspension with an optional pigment in water and surfactant; followed by aggregating the mixture by heating, thereby providing toner particles with an average particle volume diameter of from between about 3 to about 21 microns when said pigment is present.

U.S. Pat. No. 5,308,734 (Sacripante et al.), the disclosure of which is totally incorporated herein by reference, discloses a process for the preparation of toner compositions which comprises generating an aqueous dispersion of toner fines, ionic surfactant and nonionic surfactant, adding thereto a counterionic surfactant with a polarity opposite to that of said ionic surfactant, homogenizing and stirring said mixture, and heating to provide for coalescence of said toner fine particles.

U.S. Pat. No. 5,348,832 (Sacripante et al.), the disclosure of which is totally incorporated herein by reference, discloses a toner composition comprising pigment and a sulfonated polyester of the formula or as essentially represented by the formula

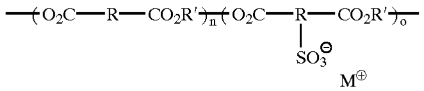

wherein M is an ion independently selected from the group consisting of hydrogen, ammonium, an alkali metal ion, an alkaline earth metal ion, and a metal ion; R is independently selected from the group consisting of aryl and alkyl; R' is independently selected from the group consisting of alkyl and oxyalkylene; and n and o represent random segments; and wherein the sum of n and o are equal to 100 mole percent. The toner is prepared by an in situ process which comprises the dispersion of a sulfonated polyester of the formula or as essentially represented by the formula

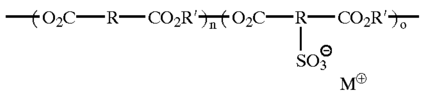

wherein M is an ion independently selected from the group consisting of hydrogen, ammonium, an alkali metal ion, an alkaline earth metal ion, and a metal ion; R is independently selected from the group consisting of aryl and alkyl; R' is independently selected from the group consisting of alkyl and oxyalkylene; and n and o represent random segments; and wherein the sum of n and o are equal to 100 mole percent, in a vessel containing an aqueous medium of an anionic surfactant and a nonionic surfactant at a temperature of from about 100° C. to about 180° C., thereby obtaining suspended particles of about 0.05 micron to about 2 microns in volume average diameter; subsequently homogenizing the resulting suspension at ambient temperature; followed by aggregating the mixture by adding thereto a mixture of cationic surfactant and pigment particles to effect aggregation of said pigment and sulfonated polyester particles; followed by heating the pigment-sulfonated polyester particle aggregates above the glass transition temperature of the sulfonated polyester causing coalescence of the aggregated particles to provide toner particles with an average particle volume diameter of from between 3 to 21 microns.

U.S. Pat. No. 5,593,807 (Sacripante et al.), the disclosure of which is totally incorporated herein by reference, discloses a process for the preparation of toner compositions comprising: (i) preparing an emulsion latex comprising sodio sulfonated polyester resin particles of from about 5 to about 500 nanometers in size diameter by heating said resin in water at a temperature of from about 65° C. to about 90° C.; (ii) preparing a pigment dispersion in a water by dispersing in water from about 10 to about 25 weight percent of sodio sulfonated polyester and from about 1 to about 5 weight percent of pigment; (iii) adding the pigment dispersion to a latex mixture comprising sulfonated polyester resin particles in water with shearing, followed by the addition of an alkali halide in water until aggregation results as indicated by an increase in the latex viscosity of from about 2 centipoise to about 100 centipoise; (iv) heating the resulting mixture at a temperature of from about 45° C. to about 80° C. thereby causing further aggregation and enabling coalescence, resulting in toner particles of from about 4 to about 9 microns in volume average diameter and with a geometric distribution of less than about 1.3; and optionally (v) cooling the product mixture to about 25° C. and followed by washing and drying.

U.S. Pat. No. 5,648,193 (Patel et al.), the disclosure of which is totally incorporated herein by reference, discloses a process for the preparation of toner compositions or particles comprising i) flushing a pigment into a sulfonated polyester resin, and which resin has a degree of sulfonation of from between about 2.5 and 20 mol percent; ii) dispersing the resulting sulfonated pigmented polyester resin into water, which water is at a temperature of from about 40 to about 95° C., by a high speed shearing polytron device operating at speeds of from about 100 to about 5,000 revolutions per minute thereby enabling the formation of stable toner sized submicron particles, and which particles are of a volume average diameter of from about 5 to about 200 nanometers; iii) allowing the resulting dispersion to cool to from about 5 to about 10° C. below the glass transition temperature of said pigmented sulfonated polyester resin; iv) adding an alkali metal halide solution, which solution contains from about 0.5 percent to about 5 percent by weight of water, followed by stirring and heating from about room temperature, about 25° C., to a temperature below the resin Tg to induce aggregation of said submicron pigmented particles to obtain toner size particles of from about 3 to about 10 microns in volume average diameter and with a narrow GSD; or stirring and heating to a temperature below the resin Tg, followed by the addition of alkali metal halide solution until the desired toner size of from about 3 to about 10 microns in volume average diameter and with a narrow GSD is achieved; and v) recovering said toner by filtration and washing with cold water, drying said toner particles by vacuum, and thereafter, optionally blending charge additives and flow additives.

U.S. Pat. No. 5,658,704 (Patel et al.), the disclosure of which is totally incorporated herein by reference, discloses a process for the preparation of toner comprising i) flushing pigment into a sulfonated polyester resin, and which resin has a degree of sulfonation of from between about 0.5 and about 2.5 mol percent based on the repeat unit of the polymer; ii) dispersing the resulting pigmented sulfonated polyester resin in warm water, which water is at a temperature of from about 400 to about 95° C., and which dispersing is accomplished by a high speed shearing polytron device operating at speeds of from about 100 to about 5,000 revolutions per minute thereby enabling the formation of toner sized particles, and which particles are of a volume average diameter of from about 3 to about 10 microns with a narrow GSD; iii) recovering said toner by filtration; iv) drying said toner by vacuum; and v) optionally adding to said dry toner charge additives and flow aids.

U.S. Pat. No. 5,660,965 (Mychajlowskij et al.), the disclosure of which is totally incorporated herein by reference, discloses a process for the preparation of toner compositions or toner particles comprising generating a latex comprising a sulfonated polyester and olefinic resin in water; generating a pigment mixture comprised of said pigment dispersed in water; shearing said latex and said pigment mixture; adding an alkali (II) halide; stirring and heating to enable coalescence; followed by filtration and drying.

U.S. Pat. No. 5,840,462 (Foucher et al.), the disclosure of which is totally incorporated herein by reference, discloses a process for the preparation of toner which involves i) flushing a colorant into a sulfonated polyester resin; ii) mixing an organic soluble dye with the colorant polyester resin of i); iii) dispersing the resulting mixture into warm water thereby enabling the formation of submicron particles; iv) allowing the resulting solution to cool below about, or about equal to the glass transition temperature of said sulfonated polyester resin; v) adding an alkali halide solution and heating; and optionally vi) recovering said toner, followed by washing and drying.

U.S. Pat. No. 5,853,944 (Foucher et al.), the disclosure of which is totally incorporated herein by reference, discloses a process for the preparation of toner with a first aggregation of sulfonated polyester, and thereafter a second aggregation with a colorant dispersion and an alkali halide.

U.S. Pat. No. 5,916,725 (Patel et al.), the disclosure of which is totally incorporated herein by reference, discloses a process for the preparation of toner comprising mixing an amine, an emulsion latex containing sulfonated polyester resin, and a colorant dispersion, heating the resulting mixture, and optionally cooling.

U.S. Pat. No. 5,919,595 (Mychajlowskij et al.), the disclosure of which is totally incorporated herein by reference, discloses a process for the preparation of toner comprising mixing an emulsion latex, a colorant dispersion, and monocationic salt, and which mixture possesses an ionic strength of from about 0.001 molar (M) to about 5 molar, and optionally cooling.

U.S. Pat. No. 5,945,245 (Mychajlowskij et al.), the disclosure of which is totally incorporated herein by reference, discloses a surfactant free process for the preparation of toner comprising heating a mixture of an emulsion latex, a colorant, and an organic complexing agent.

U.S. Pat. No. 6,054,240 (Julien et al.), the disclosure of which is totally incorporated herein by reference, discloses a yellow toner including a resin, and a colorant comprising a mixture of a yellow pigment and a yellow dye, wherein the combined weight of the colorant is from about 1 to about 50 weight percent of the total weight of the toner, and wherein the chroma of developed toner is from about 90 to about 130 CIELAB units.

U.S. Pat. No. 6,017,671 (Sacripante et al.), the disclosure of which is totally incorporated herein by reference, discloses a toner composition comprising a polyester resin with hydrophobic end groups, colorant, optional wax, optional charge additive, and optional surface additives.

U.S. Pat. No. 6,020,101 (Sacripante et al.), the disclosure of which is totally incorporated herein by reference, discloses a toner comprising a core which comprises a first resin and colorant, and thereover a shell which comprises a second resin and wherein said first resin is an ion complexed sulfonated polyester resin, and said second resin is a transition metal ion complex sulfonated polyester resin.

U.S. Pat. No. 5,604,076 (Patel et al.), the disclosure of which is totally incorporated herein by reference, discloses A process for the preparation of toner compositions comprising: (i) preparing a latex or emulsion resin comprising a polyester core encapsulated within a styrene based resin shell by heating said polyester emulsion containing an anionic surfactant with a mixture of monomers of styrene and acrylic acid, and with potassium persulfate, ammonium persulfate, sodium bisulfite, or mixtures thereof; (ii) adding a pigment dispersion, which dispersion is comprised of a pigment, a cationic surfactant, and optionally a charge control agent, followed by the sharing of the resulting blend; (iii) heating the above sheared blend below about the glass transition temperature (Tg) of the resin to form electrostatically bound toner size aggregates with a narrow particle size distribution; and (iv) heating said electrostatically bound aggregates above about the Tg of the resin.

Copending Application U.S. Ser. No. 09/657,340, filed Sep. 7, 2000, entitled "Toner Aggregation Processes," with the named inventors Raj D. Patel, Michael A. Hopper, Emily L. Moore and Guerino G. Sacripante, the disclosure of which is totally incorporated herein by reference, discloses a process for the preparation of toner including (i) generating by emulsion polymerization in the presence of an initiator a first resin latex emulsion; (ii) generating by polycondensation a second resin latex optionally in the presence of a catalyst; (iib) dispersing the resin of (ii) in water; (iii) mixing (iib) with a colorant thereby providing a colorant dispersion; (iiib) mixing the resin latex emulsion of (i) with the resin/colorant mixture of (iii) to provide a blend of a resin and colorant; (iv) adding an aqueous inorganic cationic coagulant solution of a polymeric metal salt and optionally an organic cationic coagulant to the resin/colorant blend of (iiib); (v) heating at a temperature of from about 5 to about 10 degrees Centigrade below the resin Tg of (i), to thereby form aggregate particles and which particles are optionally at a pH of from about 2 to about 3.5; (vi) adjusting the pH of (v) to about 6.5 to about 9 by the addition of a base; (vii) heating the aggregate particles of (v) at a temperature of from about 5 to about 50 degrees Centigrade above the Tg of the resin of (i), followed by a reduction of the pH to from about 2.5 to about 5 by the addition of an acid resulting in coalesced toner; (viii) optionally isolating the toner.

Copending Application U.S. Ser. No. 09/415,074, filed October 12, 1999, and Copending Application U.S. Ser. No. 09/624,532, filed July 24, 2000, both entitled "Toner Compositions," with the named inventors Rina Carlini, Guerino G. Sacripante, and Richard P. N. Veregin, the disclosures of each of which are totally incorporated herein by reference, disclose a toner comprising a sulfonated polyester resin, colorant, and thereover a quaternary organic component ionically bound to the toner surface.

In a particularly preferred embodiment of the present invention (with example amounts provided to indicate relative ratios of materials), the emulsion aggregation process entails first generating a colloidal solution of a sodiosulfonated polyester resin (about 300 grams in 2 liters of water) by heating the mixture at from about 20 to about 40° C. above the polyester polymer glass transition temperature, thereby forming a colloidal solution of submicron particles in the size range of from about 10 to about 70 nanometers.

Subsequently, to this colloidal solution is added a colorant such as Pigment Blue 15:3, available from Sun Chemicals, in an amount of from about 3 to about 5 percent by weight of toner. The resulting mixture is heated to a temperature of from about 50 to about 60° C., followed by adding thereto an aqueous solution of a metal salt such as zinc acetate (5 percent by weight in water) at a rate of from about 1 to about 2 milliliters per minute per 100 grams of polyester resin, causing the coalescence and ionic complexation of sulfonated polyester colloid and colorant to occur until the particle size of the core composite is from about 3 to about 6 microns in diameter (volume average throughout unless otherwise indicated or inferred) with a geometric distribution of from about 1.15 to about 1.25 as measured by the Coulter Counter. Thereafter, the reaction mixture is cooled to about room temperature, followed by filtering, washing once with deionized water, and drying to provide a toner comprising a sulfonated polyester resin and colorant wherein the particle size of the toner is from about 3 to about 6 microns in diameter with a geometric distribution of from about 1.15 to about 1.25 as measured by the Coulter Counter. The washing step can be repeated if desired. The particles are now ready for the conductive polymer surface treatment.

When particles without colorant are desired, the emulsion aggregation process entails diluting with water to 40 weight percent solids the sodio-sulfonated polyester resin instead of adding it to a pigment dispersion, followed by the other steps related hereinabove.

Subsequent to synthesis of the toner particles, the toner particles are washed, preferably with water. Thereafter, a poly(3,4-ethylenedioxythiophene), which, in its reduced form is of the formula

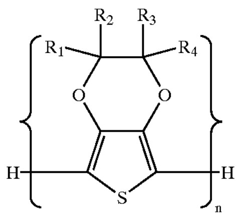

wherein each of $R_1$, $R_2$, $R_3$, and $R_4$, independently of the others, is a hydrogen atom, an alkyl group, including linear, branched, saturated, unsaturated, cyclic, and substituted alkyl groups, typically with from 1 to about 20 carbon atoms and preferably with from 1 to about 16 carbon atoms, although the number of carbon atoms can be outside of these ranges, an alkoxy group, including linear, branched, saturated, unsaturated, cyclic, and substituted alkoxy groups, typically with from 1 to about 20 carbon atoms and preferably with from 1 to about 16 carbon atoms, although the number of carbon atoms can be outside of these ranges, an aryl group, including substituted aryl groups, typically with from 6 to about 16 carbon atoms, and preferably with from 6 to about 14 carbon atoms, although the number of carbon atoms can be outside of these ranges, an aryloxy group, including substituted aryloxy groups, typically with from 6 to about 17 carbon atoms, and preferably with from 6 to about 15 carbon atoms, although the number of carbon atoms can be outside of these ranges, an arylalkyl group or an alkylaryl group, including substituted arylalkyl and substituted alkylaryl groups, typically with from 7 to about 20 carbon atoms, and preferably with from 7 to about 16 carbon atoms, although the number of carbon atoms can be outside of these ranges, an arylalkyloxy or an alkylaryloxy group, including substituted arylalkyloxy and substituted alkylaryloxy groups, typically with from 7 to about 21 carbon atoms, and preferably with from 7 to about 17 carbon atoms, although the number of carbon atoms can be outside of these ranges, a heterocyclic group, including substituted heterocyclic groups, wherein the hetero atoms can be (but are not limited to) nitrogen, oxygen, sulfur, and phosphorus, typically with from about 4 to about 6 carbon atoms, and preferably with from about 4 to about 5 carbon atoms, although the number of carbon atoms can be outside of these ranges, wherein the substituents on the substituted alkyl, alkoxy, aryl, aryloxy, arylalkyl, alkylaryl, arylalkyloxy, alkylaryloxy, and heterocyclic groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, mixtures thereof, and the like, as well as mixtures thereof, and wherein two or more substituents can be joined together to form a ring, and n is an integer representing the number of repeat monomer units, is applied to the particle surfaces by an oxidative polymerization process. The toner particles are suspended in a solvent in which the toner particles will not dissolve, such as water, methanol, ethanol, butanol, acetone, acetonitrile, blends of water with methanol, ethanol, butanol, acetone, acetonitrile, and/or the like, preferably in an amount of from about 5 to about 20 weight percent toner particles in the solvent, and the 3,4-ethylenedioxythiophene monomer is added slowly (a typical addition time period would be over about 10 minutes) to the solution with stirring. The 3,4-ethylenedioxythiophene monomer typically is added in an amount of from about 5 to about 15 percent by weight of the toner particles. The 3,4-ethylenedioxythiophene monomer, of the formula

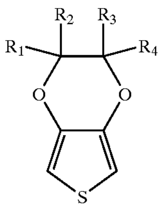

wherein $R_1$, $R_2$, $R_3$, and $R_4$ are as defined above, is hydrophobic, and it is desired that the monomer become adsorbed onto the toner particle surfaces. Thereafter, the solution is stirred for a period of time, typically from about 0.5 to about 3 hours to enable the monomer to be absorbed into the toner particle surface. When a dopant is employed, it is typically added at this stage, although it can also be added after addition of the oxidant. Subsequently, the oxidant selected is dissolved in a solvent sufficiently polar to keep the particles from dissolving therein, such as water, methanol, ethanol, butanol, acetone, acetonitrile, or the like, typically in a concentration of from about 0.1 to about 5 molar equivalents of oxidant per molar equivalent of 3,4-ethylenedioxythiophene monomer, and slowly added dropwise with stirring to the solution containing the toner particles. The amount of oxidant added to the solution typically is in a molar ratio of 1:1 or less with respect to the 3,4-ethylenedioxythiophene, although a molar excess of oxidant can also be used and can be preferred in some instances. The oxidant is preferably added to the solution subsequent to addition of the 3,4-ethylenedioxythiophene monomer so that the 3,4-ethylenedioxythiophene has had time to adsorb onto the toner particle surfaces prior to polymerization, thereby enabling the 3,4-ethylenedioxythiophene to polymerize on the toner particle surfaces instead of forming separate particles in the solution. When the oxidant addition is complete, the solution is again stirred for a period of time, typically from about 1 to about 2 days, although the time can be outside of this range, to allow the polymerization and doping process to occur. Thereafter, the toner particles having poly(3,4-ethylenedioxythiophene) polymerized on the surfaces thereof are washed, preferably with water, to remove therefrom any poly(3,4-ethylenedioxythiophene) that formed in the solution as separate particles instead of as a coating on the toner particle surfaces, and the toner particles are dried. The entire process typically takes place at about room temperature (typically from about 15 to about 30° C.), although lower temperatures can also be used if desired.

Particularly preferred $R_1$, $R_2$, $R_3$, and $R_4$ groups on the 3,4-ethylenedioxythiophene monomer and poly(3,4-ethylenedioxythiophene) polymer include hydrogen atoms, linear alkyl groups of the formula $—(CH_2)_nCH_3$ wherein n is an integer of from 0 to about 16, linear alkyl sulfonate groups of the formula $—(CH_2)_nSO_3—M^+$ wherein n is an integer of from 1 to about 6 and M is a cation, such as sodium, potassium, other monovalent cations, or the like, and linear alkyl ether groups of the formula $—(CH_2)_nOR_3$ wherein n is an integer of from 0 to about 6 and $R_3$ is a hydrogen atom or a linear alkyl group of the formula $—(CH_2)_mCH_3$ wherein n is an integer of from 0 to about 6. Specific examples of preferred 3,4-ethylenedioxythiophene monomers include those with $R_1$ and $R_3$ as hydrogen groups and $R_2$ and $R_4$ groups as follows:

| $R_2$ | $R_4$ |
|---|---|
| H | H |
| $(CH_2)_nCH_3$ n = 0–14 | H |
| $(CH_2)_nCH_3$ n = 0–14 | $(CH_2)_nCH_3$ n = 0–14 |
| $(CH_2)_nSO_3$ —$Na^+$ n = 1–6 | H |
| $(CH_2)_nSO_3$ —$Na^+$ n = 1–6 | $(CH_2)_nSO_3$ —$Na^+$ n = 1–6 |
| $(CH_2)_nOR_3$ n = 0–4 $R_3$ = H, $(CH_2)_mCH_3$ m = 0–4 | H |
| $(CH_2)_nOR_3$ n = 0–4 $R_3$ = H, $(CH_2)_mCH_3$ m = 0–4 | $(CH_2)_nOR_3$ n = 0–4 $R_3$ = H, $(CH_2)_mCH_3$ m = 0–4 |

Unsubstituted 3,4-ethylenedioxythiophene monomer is commercially available from, for example Bayer AG. Substituted 3,4-ethylenedioxythiophene monomers can be prepared by known methods. For example, the substituted thiophene monomer 3,4-ethylenedioxythiophene can be synthesized following early methods of Fager (Fager, E. W. *J. Am. Chem. Soc.* 1945, 67, 2217), Becker et al. (Becker, H. J.; Stevens, W. *Rec. Trav. Chim.* 1940, 59, 435) Guha and Iyer (Guha, P. C., Iyer, B. H.; *J. Ind. Inst. Sci.* 1938, A21, 115), and Gogte (Gogte, V. N.; Shah, L. G.; Tilak, B. D.; Gadekar, K. N.; Sahasrabudhe, M. B.; *Tetrahedron*, 1967, 23, 2437). More recent references for the EDOT synthesis and 3,4-alkylenedioxythiophenes are the following: Pei, Q.; Zuccarello, G.; Ahlskog, M.; Inganas, O. *Polymer*, 1994, 35(7), 1347; Heywang, G.; Jonas, F. *Adv. Mater.* 1992, 4(2), 116; Jonas, F.; Heywang, G.; *Electrochimica Acta.* 1994, 39(8/9), 1345; Sankaran, B.; Reynolds, J. R.; *Macromolecules*, 1997, 30, 2582; Coffey, M.; McKellar, B. R.; Reinhardt, B. A.; Nijakowski, T.; Feld, W. A.; Syn. *Commun.*, 1996, 26(11), 2205; Kumar, A.; Welsh, D. M.; Morvant, M. C.; Piroux, F.; Abboud, K. A.; Reynolds, J. R. *Chem. Mater.* 1998, 10, 896; Kumar, A.; Reynolds, J. R. *Macromolecules*, 1996, 29, 7629; Groenendaal, L.; Jonas, F.; Freitag, D.; Pielartzik, H.; Reynolds, J. R.; *Adv. Mater.* 2000, 12(7), 481; and U.S. Pat. No. 5,035,926, the disclosures of each of which are totally incorporated herein by reference. The synthesis of poly(3,4-ethylenedioxypyrrole)s and 3,4-ethylenedioxypyrrole monomers is also disclosed in Merz, A., Schropp, R., Doötterl, E., Synthesis, 1995, 795; Reynolds, J. R.; Brzezinski, J., DuBois, C. J., Giurgiu, I., Kloeppner, L., Ramey, M. B., Schottland, P., Thomas, C., Tsuie, B. M., Welsh, D. M., Zong, K., *Polym. Prepr. Am. Chem. Soc. Div. Polym. Chem*, 1999, 40(2), 1192; Thomas, C. A., Zong, K., Schottland, P., Reynolds, J. R., *Adv. Mater.*, 2000, 12(3), 222; Thomas, C. A., Schottland, P., Zong, K, Reynolds, J. R., *Polym. Prepr. Am. Chem. Soc. Div. Polym. Chem*, 1999, 40(2), 615; and Gaupp, C. L., Zong, K., Schottland, P., Thompson, B. C., Thomas, C. A., Reynolds, J. R., *Macromolecules*, 2000, 33, 1132; the disclosures of each of which are totally incorporated herein by reference.

An example of a monomer synthesis is as follows:

Thiodiglycolic acid (1, 50 grams, commercially available from Aldrich or Fluka) is dissolved in methanol (200 milliliters) and concentrated sulfuric acid (57 milliliters) is added slowly with continuous stirring. After refluxing for 16 to 24 hours, the reaction mixture is cooled and poured into water (300 milliliters). The product is extracted with diethyl ether (200 milliliters) and the organic layer is repeatedly washed with saturated aqueous $NaHCO_3$, dried with $MgSO_4$, and concentrated by rotary evaporation. The residue is distilled to give colorless dimethyl thiodiglycolate (2, 17 grams). If the solvent is changed to ethanol the resulting product obtained is diethyl thiodiglycolate (3).

A solution of 2 and diethyl oxalate (4, 22 grams, commercially available from Aldrich) in methanol (100 milliliters) is added dropwise into a cooled (0° C.) solution of sodium methoxide (34.5 grams) in methanol (150 milliliters). After the addition is completed, the mixture is refluxed for 1 to 2 hours. The yellow precipitate that forms is filtered, washed with methanol, and dried in vacuum at room temperature. A pale yellow powder of disodium 2,5-dicarbomethoxy-3,4-dioxythiophene (5) is obtained in 100 percent yield (28 grams). The disodium 2,5-dicarbethyoxy-3,4-dioxythiophene (6) derivative of 5 can also be used instead of the methoxy derivative. This material is prepared similarly to 5 except 3 and diethyl oxalate (4) in ethanol is added dropwise into a cooled solution of sodium ethoxide in ethanol.

The salt either 5 or 6 is dissolved in water and acidified with 1 Molar HCI added slowly dropwise with constant stirring until the solution becomes acidic. Immediately following, thick white precipitate falls out. After filtration, the precipitate is washed with water and air-dried to give 2,5-dicarbethoxy-3,4-dihydroxythiophene (7). The salt either (5, 2.5 grams) or 6 can be alkylated directly or the dihydrothiophene derivative (7) can be suspended in the appropriate 1,2-dihaloalkane or substituted 1,2-dihaloalkane and refluxed for 24 hours in the presence of anhydrous $K_2CO_3$ in anhydrous DMF. To prepare EDOT, either 1,2-dicholorethane (commercially available from Aldrich) or 1,2-dibromoethane (commercially from Aldrich) is used. To prepare the various substituted EDOT derivatives the appropriate 1,2-dibromoalkane is used, such as 1-dibromodecane, 1,2-dibromohexadecane (prepared from 1-hexadecene and bromine), 1,2-dibromohexane, other reported 1,2-dibromoalkane derivatives, and the like. The resulting 2,5-dicarbethoxy-3,4-ethylenedioxythiophene or 2,5-dicarbethoxy-3,4-alkylenedioxythiophene is refluxed in base, for example 10 percent aqueous sodium hydroxide solution for 1 to 2 hours, and the resulting insoluble material is collected by filtration. This material is acidified with 1 Normal HCl and recrystallized from methanol to produce either 2,5-dicarboxy-3,4-ethylenedioxythiophene or the corresponding 2,5-dicarboxy-3,4-alkylenedioxythiophene. The final step to reduce the carboxylic acid functional groups to hydrogen to produce the desired monomer is given in the references above.

Examples of suitable oxidants include water soluble persulfates, such as ammonium persulfate, potassium persulfate, and the like, cerium (IV) sulfate, ammonium cerium (IV) nitrate, ferric salts, such as ferric chloride, iron (III) sulfate, ferric nitrate nanohydrate, tris(p-toluenesulfonato)iron (III) (commercially available from Bayer under the tradename Baytron C), and the like. The oxidant is typically employed in an amount of from about 0.1 to about 5 molar equivalents of oxidant per molar equivalent of 3,4-ethylenedioxythiophene monomer, preferably from about 0.25 to about 4 molar equivalents of oxidant per molar equivalent of 3,4-ethylenedioxythiophene monomer, and more preferably from about 0.5 to about 3 molar equivalents of oxidant per molar equivalent of 3,4-ethylenedioxythiophene monomer, although the relative amounts of oxidant and 3,4-ethylenedioxythiophene can be outside of these ranges.

The molecular weight of the poly(3,4-ethylenedioxythiophene) formed on the toner particle surfaces need not be high; typically the polymer has at least about 3 repeat 3,4-ethylenedioxythiophene units, and preferably has at least about 6 repeat 3,4-ethylenedioxythiophene units, to enable the desired toner particle conductivity. If desired, the molecular weight of the poly(3,4-ethylenedioxythiophene) formed on the toner particle surfaces can be adjusted by varying the molar ratio of oxidant to monomer (EDOT), the acidity of the medium, the reaction time of the oxidative polymerization, and/or the like. Molecular weights wherein the number of EDOT repeat monomer units is about 1,000 or higher can be employed, although higher molecular weights tend to make the material more insoluble and therefore more difficult to process. Preferably the number of repeat 3,4-ethylenedioxythiophene units is no more than about 100.

Alternatively, instead of coating the poly(3,4-ethylenedioxythiophene) onto the toner particle surfaces, the poly(3,4-ethylenedioxythiophene) can be incorporated into the toner particles during the toner preparation process. For example, the poly(3,4-ethylenedioxythiophene) polymer can be prepared during the aggregation of the toner latex process to make the toner size particles, and then as the particles coalesced, the poly(3,4-ethylenedioxythiophene) polymer can be included within the interior of the toner particles in addition to some polymer remaining on the surface. Another method of incorporating the poly(3,4-ethylenedioxythiophene) within the toner particles is to perform the oxidative polymerization of the 3,4-ethylenedioxythiophene monomer on the aggregated toner particles prior to heating for particle coalescence. As the irregular shaped particles are coalesced with the poly(3,4-ethylenedioxythiophene) polymer the polymer can be embedded or partially mixed into the toner particles as the particle coalesce. Yet another method of incorporating poly (3,4-ethylenedioxythiophene) within the toner particles is to add the 3,4-ethylenedioxythiophene monomer, dopant, and oxidant after the toner particles are coalesced and cooled but before any washing is performed. The oxidative polymerization can, if desired, be performed in the same reaction kettle to minimize the number of process steps.

In addition to polymerizing the 3,4-ethylenedioxythiophene monomer in the toner particle and/or on the toner particle surface, an aqueous dispersion of poly(3,4-ethylenedioxythiophene) (such as that commercially available under the tradename Baytron P from Bayer) can be used to produce a conductive surface on the toner particles by adding some of the aqueous dispersion of poly(3,4-ethylenedioxythiophene) to the washed aggregated/coalesced toner particles, or by adding the aqueous dispersion of poly(3,4-ethylenedioxythiophene) during the aggregation process, thereby including the poly(3,4-ethylenedioxythiophene) into the interior of the toner particles and also on the surface of the toner particles. Additionally, the aqueous dispersion of poly(3,4-ethylenedioxythiophene) can be added after aggregation but prior to coalescence; further, the aqueous dispersion of poly(3,4-ethylenedioxythiophene) can be added after aggregation and coalescence has occurred but before the particles are washed.

To achieve the desired toner particle conductivity, it is desirable for the poly(3,4-ethylenedioxythiophene) to be in its oxidized form. The poly(3,4-ethylenedioxythiophene) can be shifted to its oxidized form by doping it with dopants such as sulfonate, phosphate, or phosphate moieties, iodine, or the like. Poly(3,4-ethylenedioxythiophene) in its doped and oxidized form is believed to be of the formula

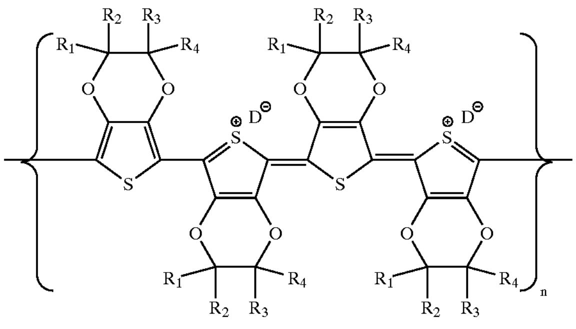

wherein $R_1$, $R_2$, $R_3$, and $R_4$ are as defined above, $D^-$ corresponds to the dopant, and n is an integer representing the number of repeat monomer units. For example, poly(3,4-ethylenedioxythiophene) in its oxidized form and doped with sulfonate moieties is believed to be of the formula

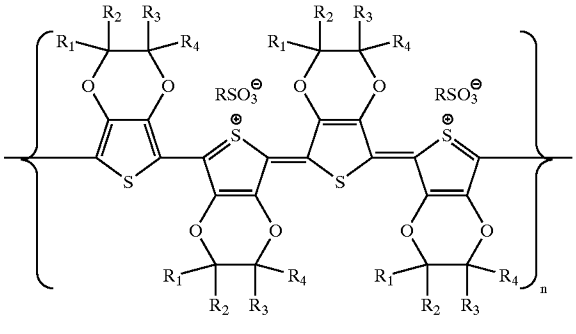

wherein $R_1$, $R_2$, $R_3$, and $R_4$ are as defined dbove, R corresponds to the organic portion of the sulfonate dopant molecule, such as an alkyl group, including linear, branched, saturated, unsaturated, cyclic, and substituted alkyl groups, typically with from 1 to about 20 carbon atoms and preferably with from 1 to about 16 carbon atoms, although the number of carbon atoms can be outside of these ranges, an alkoxy group, including linear, branched, saturated, unsaturated, cyclic, and substituted alkoxy groups, typically with from 1 to about 20 carbon atoms and preferably with from 1 to about 16 carbon atoms, although the number of carbon atoms can be outside of these ranges, an aryl group, including substituted aryl groups, typically with from 6 to about 16 carbon atoms, and preferably with from 6 to about 14 carbon atoms, although the number of carbon atoms can be outside of these ranges, an aryloxy group, including substituted aryloxy groups, typically with from 6 to about 17 carbon atoms, and preferably with from 6 to about 15 carbon atoms, although the number of carbon atoms can be outside of these ranges, an arylalkyl group or an alkylaryl group, including substituted arylalkyl and substituted alkylaryl groups, typically with from 7 to about 20 carbon atoms, and preferably with from 7 to about 16 carbon atoms, although the number of carbon atoms can be outside of these ranges, an arylalkyloxy or an alkylaryloxy group, including substituted arylalkyloxy and substituted alkylaryloxy groups, typically with from 7 to about 21 carbon atoms, and preferably with from 7 to about 17 carbon atoms, although the number of carbon atoms can be outside of these ranges, wherein the substituents on the substituted alkyl, alkoxy, aryl, aryloxy, arylalkyl, alkylaryl, arylalkyloxy, and alkylaryloxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, mixtures thereof, and the like, as well as mixtures thereof, and wherein two or more substituents can be joined together to form a ring, and n is an integer representing the number of repeat monomer units.

One method of causing the poly(3,4-ethylenedioxythiophene) to be doped is to select as the polyester toner resin a sulfonated polyester toner resin. In this embodiment, some of the repeat monomer units in the polyester polymer have sulfonate groups thereon. The sulfonated polyester resin has surface exposed sulfonate groups that serve the dual purpose of anchoring and doping the coating layer of poly(3,4-ethylenedioxythiophene) onto the toner particle surface.

Another method of causing the poly(3,4-ethylenedioxythiophene) to be doped is to place groups such as sulfonate moieties on the toner particle surfaces during the toner particle synthesis. For example, the ionic surfactant selected for the emulsion aggregation process can be an anionic surfactant having a sulfonate group thereon, such as sodium dodecyl sulfonate, sodium dodecylbenzene sulfonate, dodecylbenzene sulfonic acid, dialkyl benzenealkyl sulfonates, such as 1,3-benzene disulfonic acid sodium salt, para-ethylbenzene sulfonic acid sodium salt, and the like, sodium alkyl naphthalene sulfonates, such as 1,5-naphthalene disulfonic acid sodium salt, 2-naphthalene disulfonic acid, and the like, sodium poly(styrene sulfonate), and the like, as well as mixtures thereof. During the emulsion polymerization process, the surfactant becomes grafted and/or adsorbed onto the latex particles that are later aggregated and coalesced. While the toner particles are washed subsequent to their synthesis to remove surfactant therefrom, some of this surfactant still remains on the particle surfaces, and in sufficient amounts to enable doping of the poly(3,4-ethylenedioxythiophene) so that it is desirably conductive.

Yet another method of causing the poly(3,4-ethylenedioxythiophene) to be doped is to add small dopant molecules containing sulfonate, phosphate, or phosphonate groups to the toner particle solution before, during, or after the oxidative polymerization of the 3,4-ethylenedioxythiophene. For example, after the toner particles have been suspended in the solvent and prior to addition of the 3,4-ethylenedioxythiophene, the dopant can be added to the solution. When the dopant is a solid, it is allowed to dissolve prior to addition of the 3,4-ethylenedioxythiophene monomer, typically for a period of about 0.5 hour. Alternatively, the dopant can be added after addition of the 3,4-ethylenedioxythiophene and before addition of the oxidant, or after addition of the oxidant, or at any other time during the process. The dopant is added to the poly(3,4-ethylenedioxythiophene) in any desired or effective amount, typically from about 0.1 to about 5 molar equivalents of dopant per molar equivalent of 3,4-ethylenedioxythiophene monomer, preferably from about 0.25 to about 4 molar equivalents of dopant per molar equivalent of 3,4-ethylenedioxythiophene monomer, and more preferably from about 0.5 to about 3 molar equivalents of dopant per molar equivalent of 3,4-ethylenedioxythiophene monomer, although the amount can be outside of these ranges.

Examples of suitable dopants include p-toluene sulfonic acid, camphor sulfonic acid, dodecane sulfonic acid, benzene sulfonic acid, naphthalene sulfonic acid, dodecylbenzene sulfonic acid, sodium dodecyl sulfonate, sodium dodecylbenzene sulfonate, dialkyl benzenealkyl sulfonates, such as 1,3-benzene disulfonic acid sodium salt, para-ethylbenzene sulfonic acid sodium salt, and the like, sodium alkyl naphthalene sulfonates, such as 1,5-naphthalene disulfonic acid sodium salt, 2-naphthalene disulfonic acid, and the like, poly(styrene sulfonate sodium salt), and the like.

Still another method of doping the poly(3,4-ethylenedioxythiophene) is to expose the toner particles that have the poly(3,4-ethylenedioxythiophene) on the particle surfaces to iodine vapor in solution, as disclosed in, for example, Yamamoto, T.; Morita, A.; Miyazaki, Y.; Maruyama, T.; Wakayama, H.; Zhou, Z. H.; Nakamura, Y.; Kanbara, T.; Sasaki, S.; Kubota, K.; *Macromolecules*, 1992, 25, 1214 and Yamamoto, T.; Abla, M.; Shimizu, T.; Komarudin, D.; Lee, B-L.; Kurokawa, E. *Polymer Bulletin*, 1999, 42, 321, the disclosures of each of which are totally incorporated herein by reference.

The toner particles typically have an average bulk conductivity of from about $10^{-11}$ to about 10 Siemens per centimeter, and preferably from about $10^{-11}$ to about $10^{-7}$ Siemens per centimeter, although the conductivity can be outside of this range, for applications in which the toner particles are used in ballistic aerosol marking processes. "Average bulk conductivity" refers to the ability for electrical charge to pass through a pellet of the particles, measured when the pellet is placed between two electrodes. The particle conductivity can be adjusted by various synthetic parameters of the polymerization; reaction time, molar ratios of oxidant and dopant to 3,4-ethylenedioxythiophene monomer, temperature, and the like.

The poly(3,4-ethylenedioxythiophene) thickness on the toner particles is a function of the surface area exposed for surface treatment, which is related to toner particle size and particle morphology, spherical vs potato or raspberry. For smaller particles the weight fraction of 3,4-ethylenedioxythiophene monomer used based on total mass of particles can be increased to, for example, 20 percent from 10 or 5 percent. The coating weight typically is from about 5 to about 20 weight percent of the toner particle mass. Similar amounts are used when the poly(3,4-ethylenedioxythiophene) is present throughout the particle instead of as a coating. The solids loading of the washed toner particles can be measured using a heated balance which evaporates off the water, and, based on the initial mass and the mass of the dried material, the solids loading can be calculated. Once the solids loading is determined, the toner slurry is diluted to a 10 percent loading of toner in water. For example, for 20 grams of toner particles the total mass of toner slurry is 200 grams and 2 grams of 3,4-ethylenedioxythiophene is used. Then the 3,4-ethylenedioxythiophene and other reagents are added as indicated hereinabove. For a 5 micron toner particle using a 10 weight percent of 3,4-ethylenedioxythiophene, 2 grams for 20 grams of toner particles the thickness of the conductive polymer shell was 20 nanometers. Depending on the surface morphology, which also can change the surface area, the shell can be thicker or thinner or even incomplete.

Unlike most other conductive polymer films, which typically are opaque and/or blue-black, the coatings of poly(3,4-ethylenedioxythiophene) in its oxidized form on the toner particles of the present invention are nearly non-colored and transparent, and can be coated onto toner particles of a wide variety of colors without impairing toner color quality. In addition, the use of a conductive polymeric coating on the toner particle to impart conductivity thereto is believed to be superior to other methods of imparting conductivity, such as blending with conductive surface additives, which can result in disadvantages such as reduced toner transparency, impaired gloss features, and impaired fusing performance.

The marking materials of the present invention typically exhibit interparticle cohesive forces of no more than about 20 percent, and preferably of no more than about 10 percent, although the interparticle cohesive forces can be outside of this range. There is no lower limit on interparticle cohesive forces; ideally this value is 0.

The marking materials of the present invention typically are capable of exhibiting triboelectric surface charging of from about + or −2 to about + or −60 microcoulombs per gram, and preferably of from about + or −10 to about + or −50 microcoulombs per gram, although the triboelectric charging capability can be outside of these ranges.

In the ballistic aerosol marking apparatus, high velocity gas jets in combination with the venturi convergence/divergence structure of the channels generally enables production of a gas stream of marking particles that exit the channels and remain collimated in a narrow stream well beyond the end of the channel. This collimation of the gas stream is not expected beyond the exit point for a straight tube unless the gas velocity is low. Fluid modeling also predicts that small diameter particles in a gas stream travelling at high velocity through channels with a venturi structure will remain collimated well beyond the exit point of the channel, and predicts that similar particles travelling through straight capillary tubes under similar conditions will not remain collimated beyond the channel exit point.

Testing with conventional toner particles of the type commonly used in electrostatographic imaging processes produces results similar to those predicted by the model. For example, when a Canon® CLC-500 toner and a Xerox® DocuColor® 70 toner were employed in a ballistic aerosol marking apparatus with straight channels, the particle stream exiting the straight channels spread significantly in both instances. Depending on the inner diameter of the straight channel and the particle velocity, the particle stream was observed to spread up to 15 to 20 times the diameter of the channel.

In contrast, the marking materials of the present invention, when employed in a ballistic aerosol marking apparatus with straight channels under similar conditions, the exiting particle stream remained substantially more collimated than that observed for the conventional toners.

To enable very small images to be generated by the ballistic aerosol direct marking process, specific and demanding requirements are placed on the marking material. Since the channels in the ballistic aerosol marking apparatus are narrow, the marking material particle size preferably is relatively small. In addition, the particle size distribution preferably is relatively narrow; even a small fraction of large particles (for example, particles substantially greater than about 10 microns in diameter when the channel is from about 40 to about 75 microns in inner diameter) in the marking material can clog or block the channels and stop the flow of marking material exiting the channels. Further, to enable the marking material to flow smoothly and evenly through the channels (either straight or of venturi configuration), the flow properties of the marking material particles preferably are superior to those observed with conventional electrostatographic toner particles; the particle-to-particle cohesive forces preferably are low, a result that is difficult to achieve as the particles decrease in size, since with decreasing size the particle-to-particle cohesive forces increase. It can be particularly challenging to achieve good flow of small marking particles, for example those less than about 7 microns in diameter.

Ballistic aerosol marking processes entail the use of air or other gases as the marking material transport medium to move the marking particles. The polymers commonly used to form the toner particles are frequently insulative materials; for example, styrene/acrylate copolymers and sulfonated polyester polymers typically exhibit conductivity values of from about $10^{-16}$ to less than about $10^{-12}$ Siemens per centimeter. When the toner particles are fluidized in the ballistic aerosol marking apparatus via air flow, the particles can accumulate surface charge, sticking to the walls of the apparatus and forming aggregates of particles as a result of the electrostatic charge that builds up on the particle surfaces. The conductive coatings on the toner particles increase the particle conductivity and enable improved marking particle flow. In addition, the conductive coatings also allow some degree of surface charge to be formed on the toner particle surfaces, which, as indicated hereinabove, can be desirable for purposes such as metering the marking material.

The polarity to which the toner particles of the present invention can be charged can be determined by the choice of oxidant used during the oxidative polymerization of the 3,4-ethylenedioxythiophene monomer. For example, using oxidants such as ammonium persulfate and potassium persulfate for the oxidative polymerization of the 3,4-ethylenedioxythiophene monomer tends to result in formation of toner particles that become negatively charged when subjected to triboelectric or inductive charging processes. Using oxidants such as ferric chloride and tris(p-toluenesulfonato)iron (III) for the oxidative polymerization of the 3,4-ethylenedioxythiophene monomer tends to result in formation of toner particles that become positively charged when subjected to triboelectric or inductive charging processes. Accordingly, toner particles can be obtained with the desired charge polarity without the need to change the toner resin composition, and can be achieved independently of any dopant used with the poly(3,4-ethylenedioxythiophene).

Specific embodiments of the invention will now be described in detail. These examples are intended to be illustrative, and the invention is not limited to the materials, conditions, or process parameters set forth in these embodiments. All parts and percentages are by weight unless otherwise indicated.

The particle flow values of the marking materials were measured with a Hosokawa Micron Powder tester by applying a 1 millimeter vibration for 90 seconds to 2 grams of the marking particles on a set of stacked screens. The top screen contained 150 micron openings, the middle screen contained 75 micron openings, and the bottom screen contained 45 micron openings. The percent cohesion is calculated as follows:

$$\% \text{ cohesion}=50\bullet A+30\bullet B+10\bullet C$$

wherein A is the mass of marking material remaining on the 150 micron screen, B is the mass of marking material remaining on the 75 micron screen, and C is the mass of marking material remaining on the 45 micron screen. (The equation applies a weighting factor proportional to screen size.) This test method is further described in, for example, R. Veregin and R. Bartha, Proceedings of IS&T 14th International Congress on Advances in Non-Impact Printing Technologies, pg 358–361, 1998, Toronto, the disclosure of which is totally incorporated herein by reference. For the ballistic aerosol marking materials, the input energy applied to the apparatus of 300 millivolts was decreased to 50 millivolts to increase the sensitivity of the test. The lower the percent cohesion value, the better the toner flowability.

Conductivity values of the marking materials was determined by preparing pellets of each material under 1,000 to 3,000 pounds per square inch and then applying 10 DC volts across the pellet. The value of the current flowing was then recorded, the pellet was removed and its thickness measured, and the bulk conductivity for the pellet was calculated in Siemens per centimeter.

COMPARATIVE EXAMPLE A

A linear sulfonated random copolyester resin comprising 46.5 mole percent terephthalate, 3.5 mole percent sodium sulfoisophthalate, 47.5 mole percent 1,2-propanediol, and 2.5 mole percent diethylene glycol was prepared as follows. Into a 5 gallon Parr reactor equipped with a bottom drain valve, double turbine agitator, and distillation receiver with a cold water condenser were charged 3.98 kilograms of dimethylterephthalate, 451 grams of sodium dimethyl sulfoisophthalate, 3.104 kilograms of 1,2-propanediol (1 mole excess of glycol), 351 grams of diethylene glycol (1 mole excess of glycol), and 8 grams of butyltin hydroxide oxide catalyst. The reactor was then heated to 165° C. with stirring for 3 hours whereby 1.33 kilograms of distillate were collected in the distillation receiver, and which distillate comprised about 98 percent by volume methanol and 2 percent by volume 1,2-propanediol as measured by the ABBE refractometer available from American Optical Corporation. The reactor mixture was then heated to 190° C. over a one hour period, after which the pressure was slowly reduced from atmospheric pressure to about 260 Torr over a one hour period, and then reduced to 5 Torr over a two hour period with the collection of approximately 470 grams of distillate in the distillation receiver, and which distillate comprised approximately 97 percent by volume 1,2-propanediol and 3 percent by volume methanol as measured by the ABBE refractometer. The pressure was then further reduced to about I Torr over a 30 minute period whereby an additional 530 grams of 1,2-propanediol were collected. The reactor was then purged with nitrogen to atmospheric pressure, and the polymer product discharged through the bottom drain onto a container cooled with dry ice to yield 5.60 kilograms of 3.5 mole percent sulfonated polyester resin, sodio salt of (1,2-propylene-dipropylene-5-sulfoisophthalate)-copoly (1,2-propylene-dipropylene terephthalate). The sulfonated polyester resin glass transition temperature was measured to be 56.6° C. (onset) utilizing the 910 Differential Scanning Calorimeter available from E.I. DuPont operating at a heating rate of 10° C. per minute. The number average molecular weight was measured to be 3,250 grams per mole, and the weight average molecular weight was measured to be 5,290 grams per mole using tetrahydrofuran as the solvent.

A 15 percent solids concentration of colloidal sulfonate polyester resin dissipated in aqueous media was prepared by first heating about 2 liters of deionized water to about 85° C. with stirring, and adding thereto 300 grams of the sulfonated polyester resin, followed by continued heating at about 85° C. and stirring of the mixture for a duration of from about one to about two hours, followed by cooling to about room temperature (25° C.). The colloidal solution of sodio-sulfonated polyester resin particles had a characteristic blue tinge and particle sizes in the range of from about 5 to about 150 nanometers, and typically in the range of 20 to 40 nanometers, as measured by the NiCOMP® particle sizer.

A 2 liter colloidal solution containing 15 percent by weight of the sodio sulfonated polyester resin was charged into a 4 liter kettle equipped with a mechanical stirrer. To this solution was added 42 grams of a cyan pigment dispersion containing 30 percent by weight of Pigment Blue 15:3 (available from Sun Chemicals), and the resulting mixture was heated to 56° C. with stirring at about 180 to 200 revolutions per minute. To this heated mixture was then added dropwise 760 grams of an aqueous solution containing 5 percent by weight of zinc acetate dihydrate. The dropwise addition of the zinc acetate dihydrate solution was accomplished utilizing a peristaltic pump, at a rate of addition of approximately 2.5 milliliters per minute. After the addition was complete (about 5 hours), the mixture was stirred for an additional 3 hours. A sample (about 1 gram) of the reaction mixture was then retrieved from the kettle, and a particle size of 4.9 microns with a GSD of 1.18 was measured by the Coulter Counter. The mixture was then allowed to cool to room temperature, about 25° C., overnight, about 18 hours, with stirring. The product was filtered off through a 3 micron hydrophobic membrane cloth, and the toner cake was reslurried into about 2 liters of deionized water and stirred for about 1 hour. The toner slurry was refiltered and dried on a freeze drier for 48 hours. The uncoated cyan polyester toner particles with average particle size of 5.0 microns and GSD of 1.18 was pressed into a pellet and the average bulk conductivity was measured to be $\sigma=2.6\times10^{-13}$ Siemens per centimeter. The conductivity was determined by preparing a pressed pellet of the material under 1,000 to 3,000 pounds per square inch of pressure and then applying 10 DC volts across the pellet. The value of the current flowing through the pellet was recorded, the pellet was removed and its thickness measured, and the bulk conductivity for the pellet was calculated in Siemens per centimeter.

The toner particles thus prepared were charged by blending 24 grams of carrier particles (65 micron Hoegänes core having a coating in an amount of 1 percent by weight of the carrier, said coating comprising a mixture of poly(methyl methacrylate) and SC Ultra carbon black in a ratio of 80 to 20 by weight) with 1.0 gram of toner particles to produce a developer with a toner concentration (Tc) of 4 weight percent. One sample of this mixture was conditioned overnight in a controlled atmosphere at 15 percent relative humidity at 10° C. (referred to as C zone) and another sample was conditioned overnight in a controlled atmosphere at 85 percent relative humidity at 28° C. (referred to as A zone), followed by roll milling the developer (toner and carrier) for 30 minutes to reach a stable developer charge. The total toner blow off method was used to measure the average charge ratio (Q/M) of the developer with a Faraday Cage apparatus (such as described at column 11, lines 5 to 28 of U.S. Pat. No. 3,533,835, the disclosure of which is totally incorporated herein by reference). The insulative uncoated particles reached a triboelectric charge of −48.8 microCoulombs per gram in C zone and −18.2 microCoulombs per gram in A zone. The flow properties of this toner were measured with a Hosakawa powder flow tester to be 70.8 percent cohesion.

COMPARATIVE EXAMPLE B

A colloidal solution of sodio-sulfonated polyester resin particles was prepared as described in Comparative Example A. A 2 liter colloidal solution containing 15 percent by weight of the sodio sulfonated polyester resin was charged into a 4 liter kettle equipped with a mechanical stirrer and heated to 56° C. with stirring at about 180 to 200 revolutions per minute. To this heated mixture was then added dropwise 760 grams of an aqueous solution containing 5 percent by weight of zinc acetate dihydrate. The dropwise addition of the zinc acetate dihydrate solution was accomplished utilizing a peristaltic pump, at a rate of addition of approximately 2.5 milliliters per minute. After the addition was complete (about 5 hours), the mixture was stirred for an additional 3 hours. A sample (about 1 gram) of the reaction mixture was then retrieved from the kettle, and a particle size of 4.9 microns with a GSD of 1.18 was measured by the Coulter Counter. The mixture was then allowed to cool to room temperature, about 25° C., overnight, about 18 hours, with stirring. The product was then filtered off through a 3 micron hydrophobic membrane cloth, and the toner cake was reslurried into about 2 liters of deionized water and stirred for about 1 hour. The toner slurry was refiltered and dried on a freeze drier for 48 hours. The uncoated non-pigmented polyester toner particles with average particle size of 5.0 microns and GSD of 1.18 was pressed into a pellet and the average bulk conductivity was measured to be $\sigma=2.6\times10^{-13}$ Siemens per centimeter.

The toner particles thus prepared were admixed with a carrier and charged as described in Comparative Example A. The particles reached a triboelectric charge of −137.4 microCoulombs per gram in C zone and −7.75 microCoulombs per gram in A zone. The flow properties of this toner were measured with a Hosakawa powder flow tester to be 70.8 percent cohesion.

EXAMPLE I

Cyan toner particles were prepared by the method described in Comparative Example A. The toner particles had an average particle size of 5.13 microns with a GSD of 1.16.

Approximately 10 grams of the cyan toner particles were dispersed in 52 grams of aqueous slurry (19.4 percent by weight solids pre-washed toner) with a slurry pH of 6.0 and a slurry solution conductivity of 15 microSiemens per centimeter. To the aqueous toner slurry was first added 2.0 grams (8.75 mmol) of the oxidant ammonium persulfate followed by stirring at room temperature for 15 minutes. About 0.5 grams (3.5 mmol) of 3,4-ethylenedioxythiophene monomer was pre-dispersed into 2 milliliters of a 1 percent wt/vol Neogen-RK surfactant solution, and this dispersion was transferred dropwise into the oxidant-treated toner slurry with vigorous stirring. The molar ratio of oxidant to 3,4-ethylenedioxythiophene monomer was 2.5 to 1.0, and the monomer concentration was 5 percent by weight of toner solids. 30 minutes after completion of the monomer addition, a 0.6 gram (3.5 mmol, equimolar to 3,4-ethylenedioxythiophene monomer) quantity of para-toluenesulfonic acid (external dopant) was added. The mixture was stirred for 24 hours at room temperature to afford a surface-coated cyan toner. The toner particles were filtered from the aqueous media, washed 3 times with deionized water, and then freeze-dried for 2 days. A dry yield of 9.38 grams for the poly(3,4-ethylenedioxythiophene) treated cyan 5 micron toner was obtained. The particle bulk conductivity was initially measured at $2.1\times10^{-3}$ Siemens per centimeter. About one month later the particle bulk conductivity was remeasured at about $10^{-13}$ Siemens per centimeter.

The toner particles thus prepared were admixed with a carrier and charged as described in Comparative Example A. The particles reached a triboelectric charge of −49.7 microCoulombs per gram in C zone.

It is believed that if the relative amount of 3,4-ethylenedioxythiophene is increased to 10 percent by weight of the toner particles, using the above molar equivalents of dopant and oxidant, the resulting toner particles will also be highly conductive at about $2.1\times10^{-3}$ Siemens per centimeter and that the thickness and uniformity of the poly(3,4-ethylenedioxythiophene) shell will be improved over the 5 weight percent poly(3,4-ethylenedioxythiophene) conductive shell described in this example. It is further believed that if the relative amount of 3,4-ethylenedioxythiophene is increased to 10 percent by weight of the toner particles, using the above molar equivalents of dopant and oxidant, the resulting toner particles will maintain their conductivity levels over time.

EXAMPLE II

Cyan toner particles were prepared by the method described in Comparative Example A. The toner particles had an average particle size of 5.13 microns with a GSD of 1.16.

The cyan toner particles were dispersed in water to give 62 grams of cyan toner particles in water (20.0 percent by weight solids loading) with a slurry pH of 6.2 and slurry solution conductivity of 66 microSiemens per centimeter. To the aqueous toner slurry was first added 12.5 grams (54.5 mmol) of the oxidant ammonium persulfate followed by stirring at room temperature for 15 minutes. Thereafter, 3,4-ethylenedioxythiophene monomer (3.1 grams, 21.8 mmol) was added neat and dropwise to the solution over 15 to 20 minute period with vigorous stirring. The molar ratio of oxidant to 3,4-ethylenedioxythiophene monomer was 2.5 to 1.0, and the monomer concentration was 5 percent by weight of toner solids. 30 minutes after completion of the monomer addition, the dopant para-toluenesulfonic acid (3.75 grams, 21.8 mmol, equimolar to 3,4-ethylenedioxythiophene monomer) was added. The mixture was stirred for 48 hours at room temperature to afford a surface-coated cyan toner. The toner particles were filtered from the aqueous media, washed 3 times with deionized water, and then freeze-dried for 2 days. A dry yield of 71.19 grams for the poly(3,4-ethylenedioxythiophene) treated cyan 5 micron toner was obtained. The particle bulk conductivity was measured at $2.6\times10^{-4}$ Siemens per centimeter.

The toner particles thus prepared were admixed with a carrier and charged as described in Comparative Example A. The particles reached a triboelectric charge of −51.8 microCoulombs per gram in C zone and −19.7 microCoulombs per gram in A zone. The flow properties of this toner were measured with a Hosakawa powder flow tester to be 62.8 percent cohesion.

EXAMPLE III

Unpigmented toner particles were prepared by the method described in Comparative Example B. The toner particles had an average particle size of 5.0 microns with a GSD of 1.18.

Approximately 10 grams of the cyan toner particles were dispersed in 52 grams of aqueous slurry (19.4 percent by weight solids pre-washed toner) with a slurry pH of 6.0 and a slurry solution conductivity of 15 microSiemens per centimeter. To the aqueous toner slurry was first added 4.0 grams (17.5 mmol) of the oxidant ammonium persulfate followed by stirring at room temperature for 15 minutes. Thereafter, 3,4-ethylenedioxythiophene monomer (1.0 gram, 7.0 mmol) was added neat and dropwise to the solution over 15 to 20 minute period with vigorous stirring. The molar ratio of oxidant to 3,4-ethylenedioxythiophene monomer was 2.5 to 1.0, and the monomer concentration was 10 percent by weight of toner solids. 30 minutes after completion of the monomer addition, the dopant para-toluenesulfonic acid (1.2 grams, 7.0 mmol, equimolar to 3,4-ethylenedioxythiophene monomer) was added. The mixture was stirred for 48 hours at slightly elevated temperature (between 32° C. to 35° C.) to afford a surface-coated cyan toner. The toner particles were filtered from the aqueous media, washed 3 times with deionized water, and then freeze-dried for 48 hours. A dry yield of 9.54 grams for the poly(3,4-ethylenedioxythiophene) treated cyan 5 micron toner was obtained. The particle bulk conductivity was measured at $2.9\times10^{-7}$ Siemens per centimeter.

The toner particles thus prepared were admixed with a carrier and charged as described in Comparative Example A. The particles reached a triboelectric charge of −11.1 microCoulombs per gram in C zone.

EXAMPLE IV

A Ballistic Aerosol Marking (BAM) printing test fixture is built wherein toner particles are ejected from BAM venturi structure pipes onto a substrate for direct marking studies. The substrate moves at 0.4 millimeters per second. A cylinder of dry compressed gas (either nitrogen or ambient air) equipped with a gas regulator and gas line is split into two streams by a second pressure regulator. The toner supply air line is reduced in pressure using a third gas pressure regulator which has an operating range from 0 to 50 psi. This air supply is fed into a BAM toner flow cell used to fluidize the toner and create an aerosol toner stream into the toner compartment which continuously gates toner into the BAM venturi pipes.

About 1 to 3 grams of toner is placed on top of a porous glass frit inside the BAM flow cell device of the print test fixture. This flow cell consists of a cylindrical hollow column of plexiglass about 8 centimeters tall by 6 centimeters in diameter containing two porous glass frits. The toner is placed on the lower glass frit, which is about 4 centimeters from the bottom. The second glass frit is part of the removable top portion. A piezo actuator is also present in the flow cell to help produce a continuous aerosol stream of toner. The low pressure gas supply line is connected at the bottom of the flow cell and gas is evenly distributed through the lower glass frit to create a fluidized bed of toner in the gas stream. In the toner portion of the device is attached a 1/32 inch diameter tube which is then connected to the toner reservoir hose barb of the BAM print head which contains the venturi structure BAM pipes. The fluidized toner is continuously ejected into the BAM pipes through this connecting tube.

The second gas stream operating at much higher pressures ranging from 20 to 100 psi is fed into the BAM venturi structure pipes through a 1/32 inch tube connected to the BAM print head by a hose barb. The BAM printing chip is clamped in place at 1 millimeter distance from the substrate. The toner is ejected from the BAM channels in a horizontal direction onto a substrate moving in either a horizontal or vertical direction which is controlled by a Newport Universal Motion Controller/Driver model ESP 300. After capturing all of the toner on a substrate the print quality of the lines are evaluated using an optical microscope and the line width and toner scatter about the line is determined.

The toners of Examples I through III are incorporated into this test fixture and used to generate images. It is believed that the toners will perform well, that they will exhibit minimal or no clogging of the printing channels, and that they will generate images of desirable quality.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A process for depositing marking material onto a substrate which comprises (a) providing a propellant to a head structure, said head structure having at least one channel therein, said channel having an exit orifice with a width no larger than about 250 microns through which the propellant can flow, said propellant flowing through the channel to form thereby a propellant stream having kinetic energy, said channel directing the propellant stream toward the substrate, and (b) controllably introducing a particulate marking material into the propellant stream in the channel, wherein the kinetic energy of the propellant particle stream causes the particulate marking material to impact the substrate, and wherein the particulate marking material comprises toner particles which comprise a polyester resin, an optional colorant, and poly(3,4-ethylenedioxythiophene), said toner particles having an average particle diameter of no more than about 10 microns and a particle size distribution of GSD equal to no more than about 1.25, wherein said toner particles are prepared by an emulsion aggregation process, said toner particles having an average bulk conductivity of at least about $10^{-11}$ Siemens per centimeter.

2. A process according to claim 1 wherein the toner particles have an average particle diameter of no more than about 7 microns.

3. A process according to claim 1 wherein the toner particles comprise a core comprising the polyester resin and optional colorant and, coated on the core, a coating comprising the poly(3,4-ethylenedioxythiophene).

4. A process according to claim 1 wherein the polyester resin is polyethylene terephthalate, polypropylene terephthalate, polybutylene terephthalate, polypentylene terephthalate, polyhexalene terephthalate, polyhepfadene terephthalate, polyoctalene-terephthalate, poly(propylene-diethylene terephthalate), poly(bisphenol A-fumarate), poly (bisphenol A-terephthalate), copoly(bisphenol A-terephthalate)-copoly(bisphenol A-fumarate), poly (neopentyl-terephthalate), or mixtures thereof.

5. A process according to claim 1 wherein the polyester resin is a sulfonated polyester.

6. A process according to claim 1 wherein the polyester resin is a poly(1,2-propylene-5-sulfoisophthalate), a poly (neopentylene-5-sulfoisophthalate), a poly(diethylene-5-sulfoisophthalate), a copoly(1,2-propylene-5-sulfoisophthalate)-copoly-(1,2-propylene-terephthalate phthalate), a copoly(1,2-propylene-diethylene-5-sulfoisophthalate)-copoly-(1,2-propylene-diethylene-terephthalate phthalate), a copoly(ethylene-neopentylene-5-sulfoisophthalate)-copoly-(ethylene-neopentylene-terephthalate-phthalate), a copoly(propoxylated bisphenol A)-copoly-(propoxylated bisphenol A-5-sulfoisophthalate), a copoly(ethylene-terephthalate)-copoly-(ethylene-5-sulfo-isophthalate), a copoly(propylene-terephthalate)-copoly-(propylene-5-sulfo-isophthalate), a copoly(diethylene-terephthalate)-copoly-(diethylene-5-sulfo-isophthalate), a copoly(propylene-diethylene-terephthalate)-copoly-(propylene-diethylene-5-sulfoisophthalate), a copoly (propylene-butylene-terephthalate)-copoly(propylene-butylene-5-sulfo-isophthalate), a copoly(propoxylated bisphenol-A-fumarate)-copoly(propoxylated bisphenol A-5-sulfo-isophthalate), a copoly(ethoxylated bisphenol-A-fumarate)-copoly(ethoxylated bisphenol-A-5-sulfo-isophthalate), a copoly(ethoxylated bisphenol-A-maleate)-copoly(ethoxylated bisphenol-A-5-sulfo-isophthalate), a copoly(propylene-diethylene terephthalate)-copoly (propylene-5-sulfoisophthalate), a copoly(neopentyl-terephthalate)-copoly-(neopentyl-5-sulfoisophthalate), or a mixture thereof.

7. A process according to claim 1 wherein the resin is present in the toner particles in an amount of at least about 75 percent by weight of the toner particles and wherein the resin is present in the toner particles in an amount of no more than about 99 percent by weight of the toner particles.

8. A process according to claim 1 wherein the toner particles further comprise a pigment colorant.

9. A process according to claim 1 wherein the toner particles contain a colorant, said colorant being present in an amount of at least about 1 percent by weight of the toner particles, and said colorant being present in an amount of no more than about 25 percent by weight of the toner particles.

10. A process according to claim 1 wherein the emulsion aggregation process comprises (1) shearing a first ionic surfactant with a latex mixture comprising (a) a counterionic surfactant with a charge polarity of opposite sign to that of said first ionic surfactant, (b) a nonionic surfactant, and (c) a polyester resin, thereby causing flocculation or heterocoagulation of formed particles of resin to form electrostatically bound aggregates; and (2) heating the electrostatically bound aggregates to form aggregates of at least about 1 micron in average particle diameter.

11. A process according to claim 1 wherein the emulsion aggregation process comprises (1) preparing a colorant dispersion in a solvent, which dispersion comprises a colorant and a first ionic surfactant; (2) shearing the colorant dispersion with a latex mixture comprising (a) a counterionic surfactant with a charge polarity of opposite sign to that of said first ionic surfactant, (b) a nonionic surfactant, and (c) a polyester resin, thereby causing flocculation or heterocoagulation of formed particles of colorant and resin to form electrostatically bound aggregates; and (3) heating the electrostatically bound aggregates to form aggregates of at least about 1 micron in average particle diameter.

12. A process according to claim 1 wherein the emulsion aggregation process comprises (1) shearing an ionic surfactant with a latex mixture comprising (a) a flocculating agent, (b) a nonionic surfactant, and (c) a polyester resin, thereby causing flocculation or heterocoagulation of formed particles of colorant and resin to form electrostatically bound aggregates; and (2) heating the electrostatically bound aggregates to form aggregates of at least about 1 micron in average particle diameter.

13. A process according to claim 1 wherein the emulsion aggregation process comprises (1) preparing a colorant dispersion in a solvent, which dispersion comprises a colorant and an ionic surfactant; (2) shearing the colorant dispersion with a latex mixture comprising (a) a flocculating agent, (b) a nonionic surfactant, and (c) a polyester resin, thereby causing flocculation or heterocoagulation of formed particles of colorant and resin to form electrostatically bound aggregates; and (3) heating the electrostatically bound aggregates to form aggregates of at least about 1 micron in average particle diameter.

14. A process according to claim 1 wherein the emulsion aggregation process comprises (1) preparing a colloidal solution comprising a polyester resin and an optional colorant, and (2) adding to the colloidal solution an aqueous solution containing a coalescence agent comprising an ionic metal salt to form toner particles.

15. A process according to claim 1 wherein the poly(3, 4-ethylenedioxythiophene) is formed from monomers of the formula

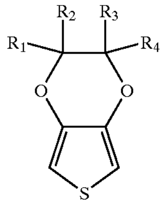

wherein each of $R_1$, $R_2$, $R_3$, and $R_4$, independently of the others, is a hydrogen atom, an alkyl group, an alkoxy group, an aryl group, an aryloxy group, an arylalkyl group, an alkylaryl group, an arylalkyloxy group, an alkylaryloxy group, or a heterocyclic group.

16. A process according to claim 15 wherein $R_1$ and $R_3$ are hydrogen atoms and $R_2$ and $R_4$ are (a) $R_2$=H, $R_4$=H; (b) $R_2=(CH_2)_nCH_3$ wherein n=0–14, $R_4$=H; (c) $R_2=(CH_2)_nCH_3$ wherein n=0–14, $R_4=(CH_2)_nCH_3$ wherein n=0–14; (d) $R_2=(CH_2)_nSO_3—Na^+$ wherein n=1–6, $R_4$=H; (e) $R_2=(CH_2)_nSO_3—Na^+$ wherein n=1–6, $R_4=(CH_2)_nSO_3—Na^+$ wherein n=1–6; (f) $R_2=(CH_2)_nOR_6$ wherein n=0–4 and $R_6$=(i) H or (ii) $(CH_2)_mCH_3$ wherein m=0–4, $R_4$=H; or (g) $R_2=(CH_2)_nOR_6$ wherein n=0–4 and $R_6$=(i) H or (ii) $(CH_2)_mCH_3$ wherein m=0–4, $R_4=(CH_2)_nOR_6$ wherein n=0–4 and $R_6$=(i) H or (ii) $(CH_2)_mCH_3$ wherein m=0–4.

17. A process according to claim 1 wherein the poly(3, 4-ethylenedioxythiophene) is of the formula

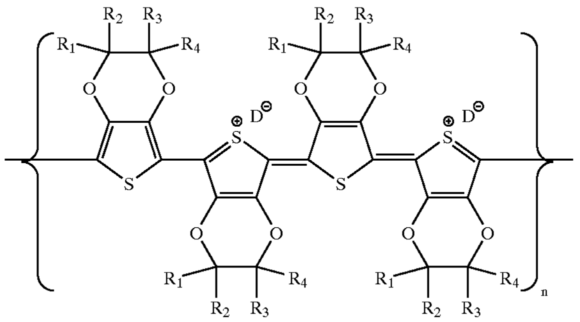

wherein each of $R_1$, $R_2$, $R_3$, and $R_4$, independently of the others, is a hydrogen atom, an alkyl group, an alkoxy group, an aryl group, an aryloxy group, an arylalkyl group, an alkylaryl group, an arylalkyloxy group, an alkylaryloxy group, or a heterocyclic group, $D^-$ is a dopant moiety, and n is an integer representing the number of repeat monomer units.

18. A process according to claim 1 wherein the poly(3,4-ethylenedioxythiophene) has at least about 3 repeat monomer units.

19. A process according to claim 1 wherein the poly(3,4-ethylenedioxythiophene) has at least about 6 repeat monomer units and wherein the poly(3,4-ethylenedioxythiophene) has no more than about 100 repeat monomer units.

20. A process according to claim 1 wherein the poly(3,4-ethylenedioxythiophene) is doped with iodine, molecules containing sulfonate groups, molecules containing phosphate groups, molecules containing phosphonate groups, or mixtures thereof.

21. A process according to claim 1 wherein the poly(3,4-ethylenedioxythiophene) is doped with sulfonate containing anions of the formula $RSO_3$—wherein R is an alkyl group, an alkoxy group, an aryl group, an aryloxy group, an arylalkyl group, an alkylaryl group, an arylalkyloxy group, an alkylaryloxy group, or mixtures thereof.

22. A process according to claim 1 wherein the poly(3,4-ethylenedioxythiophene) is doped with anions selected from p-toluene sulfonate, camphor sulfonate, benzene sulfonate, naphthalene sulfonate, dodecyl sulfonate, dodecylbenzene sulfonate, dialkyl benzenealkyl sulfonates, para-ethylbenzene sulfonate, alkyl naphthalene sulfonates, poly(styrene sulfonate), or mixtures thereof.

23. A process according to claim 1 wherein the poly(3,4-ethylenedioxythiophene) is doped with anions selected from p-toluene sulfonate, camphor sulfonate, benzene sulfonate, naphthalene sulfonate, dodecyl sulfonate, dodecylbenzene sulfonate, 1,3-benzene disulfonate, para-ethylbenzene sulfonate, 1,5-naphthalene disulfonate, 2-naphthalene disulfonate, poly(styrene sulfonate), or mixtures thereof.

24. A process according to claim 1 wherein the poly(3,4-ethylenedioxythiophene) is doped with a dopant present in an amount of at least about 0.1 molar equivalent of dopant per molar equivalent of 3,4-ethylenedioxythiophene monomer and present in an amount of no more than about 5 molar equivalents of dopant per molar equivalent of 3,4-ethylenedioxythiophene monomer.

25. A process according to claim 1 wherein the poly(3,4-ethylenedioxythiophene) is doped with a dopant present in an amount of at least about 0.25 molar equivalent of dopant per molar equivalent of 3,4-ethylenedioxythiophene monomer and present in an amount of no more than about 4 molar equivalents of dopant per molar equivalent of 3,4-ethylenedioxythiophene monomer.

26. A process according to claim 1 wherein the poly(3,4-ethylenedioxythiophene) is doped with a dopant present in an amount of at least about 0.5 molar equivalent of dopant per molar equivalent of 3,4-ethylenedioxythiophene monomer and present in an amount of no more than about 3 molar equivalents of dopant per molar equivalent of 3,4-ethylenedioxythiophene monomer.

27. A process according to claim 1 wherein the toner particles have an average bulk conductivity of no more than about 10 Siemens per centimeter.

28. A process according to claim 1 wherein the toner particles have an average bulk conductivity of no more than about $10^{-7}$ Siemens per centimeter.

29. A process according to claim 1 wherein the poly(3,4-ethylenedioxythiophene) is present in an amount of at least about 5 weight percent of the toner particle mass and wherein the poly(3,4-ethylenedioxythiophene) is present in an amount of no more than about 20 weight percent of the toner particle mass.

30. A process according to claim 1 wherein the toner particles exhibit interparticle cohesive forces of no more than about 20 percent.

31. A process according to claim 1 wherein the toner particles exhibit interparticle cohesive forces of no more than about 10 percent.

32. A process according to claim 1 wherein each said channel has a converging region and a diverging region, and wherein said propellant is introduced in said converging region and flows into said diverging region, whereby said propellant is at a first velocity and first pressure in said converging region and a second velocity and a second pressure in said diverging region, said first pressure greater than said second pressure and said first velocity less than said second velocity.

* * * * *